(12) United States Patent
Apanel et al.

(10) Patent No.: US 8,801,815 B2
(45) Date of Patent: Aug. 12, 2014

(54) SYSTEM AND METHOD FOR DUAL FLUIDIZED BED GASIFICATION

(71) Applicant: Rentech, Inc., Los Angeles, CA (US)

(72) Inventors: George Apanel, Denver, CO (US); Harold A. Wright, Longmont, CO (US)

(73) Assignee: RENTECH, Inc., Los Angeles, CA (US)

( * ) Notice: Subject to any disclaimer, the term of this patent is extended or adjusted under 35 U.S.C. 154(b) by 0 days.

(21) Appl. No.: 13/962,788

(22) Filed: Aug. 8, 2013

(65) Prior Publication Data

US 2013/0320265 A1  Dec. 5, 2013

Related U.S. Application Data

(60) Continuation of application No. 13/527,090, filed on Jun. 19, 2012, which is a division of application No. 12/691,297, filed on Jan. 21, 2010, now Pat. No. 8,241,523.

(60) Provisional application No. 61/146,185, filed on Jan. 21, 2009.

(51) Int. Cl.
| | |
|---|---|
| C01B 6/24 | (2006.01) |
| C10J 3/00 | (2006.01) |
| C10K 3/04 | (2006.01) |
| C10J 3/56 | (2006.01) |
| C10K 1/34 | (2006.01) |
| C10K 3/02 | (2006.01) |
| C10K 3/00 | (2006.01) |
| B01J 8/18 | (2006.01) |
| C01B 3/44 | (2006.01) |
| B01J 8/00 | (2006.01) |
| C10K 1/00 | (2006.01) |
| B01J 8/26 | (2006.01) |
| C10G 2/00 | (2006.01) |
| B01J 38/30 | (2006.01) |
| B01J 23/755 | (2006.01) |

(52) U.S. Cl.
CPC . *C10K 1/002* (2013.01); *C10K 3/04* (2013.01); *C10J 3/56* (2013.01); *Y02E 20/18* (2013.01); *C10K 1/34* (2013.01); *C01B 2203/061* (2013.01); *C10G 2300/202* (2013.01); *C10K 3/023* (2013.01); *C10K 3/003* (2013.01); *C10J 2300/1659* (2013.01); *C10G 2300/1011* (2013.01); *B01J 38/30* (2013.01); *B01J 8/1836* (2013.01); *Y02E 50/32* (2013.01); *C01B 2203/0822* (2013.01); *C01B 2203/0233* (2013.01); *C01B 2203/0238* (2013.01); *C01B 2203/0811* (2013.01); *C10G 2300/207* (2013.01); *B01J 2208/00292* (2013.01); *C01B 3/44* (2013.01); *B01J 8/0055* (2013.01); *C10J 2300/1853* (2013.01); *C10J 2300/092* (2013.01); *C01B 2203/0283* (2013.01); *C10J 2300/1807* (2013.01); *C01B 2203/1247* (2013.01); *C10K 1/004* (2013.01); *C10J 2300/0976* (2013.01); *C01B 2203/1241* (2013.01); *B01J 2219/00006* (2013.01); *C10J 2300/1637* (2013.01); *C01B 2203/062* (2013.01); *B01J 8/26* (2013.01); *C10G 2/32* (2013.01); *B01J 23/755* (2013.01); *B01J 8/006* (2013.01); *C10G 2300/1022* (2013.01); *C10G 2300/1003* (2013.01); *C01B 2203/0827* (2013.01); *B01J 2208/00274* (2013.01)
USPC .............. 48/197 R; 423/644; 423/648.1

(58) Field of Classification Search
CPC .......... C10J 2300/1637; C10J 2300/1807; C10J 3/54; C10J 3/56
USPC ...... 48/61, 197 R, 62 R, 210; 423/644, 648.1
See application file for complete search history.

(56) References Cited

U.S. PATENT DOCUMENTS

| | | |
|---|---|---|
| 2,483,485 A | 10/1949 | Barr |
| 2,550,741 A | 5/1951 | Welty, Jr. |
| 3,573,224 A | 3/1971 | Strelzoff et al. |
| 4,046,523 A | 9/1977 | Kalina et al. |
| 4,252,736 A | 2/1981 | Haag et al. |
| 4,397,656 A | 8/1983 | Ketkar |

| | | | |
|---|---|---|---|
| 4,854,249 A | 8/1989 | Khinkis et al. | |
| 5,160,456 A | 11/1992 | Lahn et al. | |
| 5,401,282 A | 3/1995 | Leininger et al. | |
| 5,504,118 A | 4/1996 | Benham et al. | |
| 5,624,964 A | 4/1997 | Cimini et al. | |
| 5,767,230 A | 6/1998 | Scarola et al. | |
| 5,799,482 A | 9/1998 | Marler et al. | |
| 5,868,082 A | 2/1999 | Hunter | |
| 6,025,403 A | 2/2000 | Marler et al. | |
| 6,773,691 B2 | 8/2004 | Ramani et al. | |
| 6,852,668 B2 | 2/2005 | de Lasa et al. | |
| 7,291,255 B2 | 11/2007 | Fujimura et al. | |
| 7,752,848 B2 | 7/2010 | Balan et al. | |
| 7,951,350 B1 * | 5/2011 | Taylor | 423/418.2 |
| 8,241,523 B2 | 8/2012 | Apanel et al. | |
| 2003/0005634 A1 | 1/2003 | Calderon et al. | |
| 2007/0124997 A1 | 6/2007 | Liu et al. | |
| 2008/0159930 A1 | 7/2008 | Fecteau et al. | |
| 2008/0244976 A1 | 10/2008 | Paisley | |
| 2008/0283254 A1 | 11/2008 | Huntley et al. | |
| 2009/0062108 A1 | 3/2009 | Demirel et al. | |
| 2009/0075814 A1 | 3/2009 | Duvenhage et al. | |
| 2012/0256133 A1 | 10/2012 | Apanel et al. | |

FOREIGN PATENT DOCUMENTS

| | | |
|---|---|---|
| WO | 2007044009 | 4/2007 |
| WO | 2009021258 | 2/2009 |

OTHER PUBLICATIONS

Canadian Office Action dated Dec. 4, 2012 for corresponding Canadian Application No. 2,750,257 (5 pgs.).
European Search Report dated Dec. 3, 2012 for corresponding European Application No. EP10738944.7 (5 pgs.).
International Search Report and Written Opinion dated Aug. 20, 2010, for corresponding International Application No. PCT/US2010/021622 (9 pgs.).
Office Action dated Mar. 14, 2013 for corresponding U.S. Appl. No. 13/527,090 (11 pgs.).
Office Action dated Jul. 30, 2013 for corresponding U.S. Appl. No. 13/527,090 (15 pgs.).
Proll et al., "A Dual Fluidized Bed System for Chemical Looping Combustion of Solid Fuels," Vienna University of Technology, Institute of Chemical Engineering, AIChE Annual Meeting Program Book, dated Nov. 7-12, 2010 (9 pgs.).
Mayer et al., "Dual Fluidized Bed Reforming Pilot Test Results & Potential Commercial Implications," Vienna University of Technology, Institute of Chemical Engineering, AIChE Annual Meeting Program Book, dated Nov. 7-12, 2010 (10 pgs.).
Office Action dated Dec. 22, 2011 for corresponding U.S. Appl. No. 12/691,297 (17 pgs.).
Notice of Allowance dated Jun. 12, 2012 for corresponding U.S. Appl. No. 12/691,297 (15 pgs.).
International Preliminary Report on Patentability dated Jul. 26, 2011, for corresponding International Application No. PCT/US2010/021622 (5 pgs.).
Notice of Allowance dated Aug. 22, 2013 for corresponding U.S. Appl. No. 13/527,090 (6 pgs.).
Office Action dated Nov. 13, 2013 for corresponding U.S. Appl. No. 13/962,814 (16 pgs.).
Canadian Office Action dated Oct. 17, 2013 for corresponding Canadian Application No. 2,750,257 (3 pgs.).
Apanel, George "Dual Fluidized Bed Reforming Pilot Test Results: Tar Conversion and the Fate of Sulfer," Presentation at AIChE National Meeting, San Francisco, dated Nov. 4, 2013 (19 pgs.).
Office Action dated Dec. 23, 2013 for corresponding U.S. Appl. No. 13/962,803 (23 pgs.).
European Examination Report dated Oct. 29, 2013 for corresponding European Application No. 10 738 944.7-1352 (5 pgs.).
Office Action dated May 13, 2014 for corresponding U.S. Appl. No. 13/962,803 (19 pgs.).
Notice of Allowance dated Feb. 28, 2014 for corresponding U.S. Appl. No. 13/962,814 (9 pgs.).

* cited by examiner

*Primary Examiner* — Matthew Merkling
(74) *Attorney, Agent, or Firm* — Timothy S. Westby; Porter Hedges, LLP.

(57) ABSTRACT

A method of producing a high quality synthesis gas comprising less than a desired percentage of non-synthesis gas components and a desired mole ratio of hydrogen to carbon monoxide by providing a low quality synthesis gas comprising greater than the desired percentage; introducing the low quality synthesis gas into a conditioner; introducing a flue gas into a combustor; extracting a first catalytic heat transfer stream from the conditioner, and introducing at least a portion of the first catalytic heat transfer stream into the combustor; extracting a second catalytic heat transfer stream from the combustor, and introducing at least a portion of the second catalytic heat transfer stream into the conditioner; extracting a spent flue gas from the combustor; and extracting from the conditioner the high quality synthesis gas comprising the desired percentage and the desired mole ratio.

19 Claims, 5 Drawing Sheets

SYSTEM AND METHOD FOR DUAL FLUIDIZED BED GASIFICATION

CROSS-REFERENCE TO RELATED APPLICATIONS

This application is a continuation application of U.S. patent application Ser. No. 13/527,090 now U.S. Pat. No. 8,591,610), filed Jun. 19, 2012, which is a divisional application of U.S. patent application Ser. No. 12/691,297 (now U.S. Pat. No. 8,241,523), filed Jan. 21, 2010, which claims the benefit under 35 U.S.C. §119(e) of U.S. Provisional Patent Application No. 61/146,185, filed Jan. 21, 2009. The disclosure of each of said applications is hereby incorporated herein by reference.

STATEMENT REGARDING FEDERALLY SPONSORED RESEARCH OR DEVELOPMENT

Not Applicable.

TECHNICAL FIELD

The present invention generally relates to the production of synthesis gas. More specifically, the present invention relates to the production of high-quality synthesis gas using dual fluidized beds.

BACKGROUND

In the context of its broadest general application, the term 'gasification' has generally been used to describe any process for the conversion of a solid, liquid, or vapor hydrocarbon or more heterogeneous but predominantly carbonaceous compounds into synthesis gas (also referred to as syngas). The synthesis gas generally consists of a mixture of gases consisting predominantly of carbon monoxide and hydrogen. Low quality synthesis gas may be contaminated by methane, $CO_2$, and other impurities such as, but not limited to, aromatics and high molecular weight tars. These tars, a common byproduct of biomass gasification, can be particularly undesirable since, aside from representing a syngas yield loss, such tars can lead to serious fouling and plugging of downstream process equipment when cooled below their dewpoint as required for downstream processing. When a gasification type process is applied as a secondary reaction stage for the conversion or removal of such impurities from a low quality synthesis gas, the term 'conditioning' is often used to describe such a secondary operation. Gasification or conditioning may therefore entail a wide variety of generic chemical reactions, which may include, without limitation, pyrolysis, cracking, partial oxidation, reforming, and/or shifting.

Depending on the particular carbonaceous feedstock, the impurities therein, and the specific reactions involved, such reactions may also entail the addition of steam and/or oxygen as a supplemental reactant(s) to help promote the desired reaction. Such processes may be conducted with or without the use of a catalytic or inert medium for the purpose of promoting efficient heat and mass transfer within the gasification reactor. Catalytic media may be particulate or monolithic in nature. A common drawback of some conventional gasification and proposed conditioning processes is byproduct soot formation, which can be even more problematic than tars if sufficiently 'sticky' to foul downstream process equipment at even elevated temperature levels.

Gasification with pure steam in a fluidized bed is a highly endothermic process. For this reason, gasification, for example biomass gasification, has been combined with fluidized bed combustion to provide heat enthalpy and also to remove char formed during gasification. Such char may be undesirable in the gasification producer gas. Dual fluidized bed gasification has thus been proposed in the art. Dual fluidized bed gasification is desirable due to the ability to produce high caloric product gas free of nitrogen dilution even when air is used to generate, via in situ combustion, the heat required by the endothermic gasification reactions.

Conventional gasification processes may be generally classified as either 'direct' or 'indirect'. In direct gasification processes an oxidant is directly contacted with a carbonaceous feed. In indirect gasification processes, an oxidant is supplied to a separate combustion reactor and is kept separate from the carbonaceous feed in the gasification reactor by a physical barrier which may also serve as a heat transfer medium. The medium transfers heat from the exothermic combustion reactor to the endothermic gasification reactor, as exemplified by dual fluid gasification which employs a circulating solid heat transfer medium. Another type of indirect gasification technology uses stationary heat transfer tubes to separate and transfer heat between the endothermic gasification and exothermic combustion reaction sections.

Direct gasification, which is currently widely practiced, generally utilizes three basic configurations which may be either air blown or oxygen blown: entrained flow (e.g. Siemens), fluidized bed (e.g. Winkler), and moving bed (e.g. Lurgi dry bottom). When air blown, the nitrogen component of the air undesirably dilutes the product synthesis gas, rendering it unsuitable for direct use in various applications. For this reason, many direct gasifiers are oxygen-blown, requiring a source of high purity oxygen, which tends to be expensive. For example, an air separation unit is often utilized to provide the oxygen for an oxygen-blown gasifier. Despite the use of high purity oxygen, direct gasification, especially via fluid bed and moving bed gasifiers, often provides low-quality synthesis gas which, while appropriate for many applications, may be undesirable for processes demanding high-quality synthesis gas. While oxygen blown entrained flow gasifiers may produce a better quality synthesis gas than produced by fluid bed or moving bed configurations, entrained flow gasifiers generally require more stringent feedstock preparation which may not be practical for certain types of carbonaceous feeds, such as biomass or petroleum coke. Even if free from impurities, the synthesis gas produced by entrained flow or other types of gasification technologies may not meet a desired composition for certain downstream chemical or fuel synthesis applications. Further conditioning of such synthesis gas may therefore be required.

Indirect gasification technologies, particularly those based on dual fluidized beds, are generally known to produce low-quality synthesis gas comprising undesirably large amounts of impurities such as hydrogen, methane, carbon dioxide, and high dew point tars. Such technologies also generally mandate consumption of high levels of steam and other additives such as dolomite to promote gasification and maximize levels of quality product synthesis gas. Typically, undesirable components such as methane, carbon dioxide, excess hydrogen, tars, and/or sulfur and sulfur-containing components must be removed from low-quality synthesis gas produced via gasification prior to the use of the synthesis gas in processes requiring chemical-grade synthesis gas. This contaminant removal may be costly, inefficient and complicated. The presence of such contaminants may also represent a substantial loss of potential product synthesis gas and downstream product yield if such contaminants are not converted to the high quality syngas required for certain chemical and fuel production processes.

Accordingly, there is need for systems and methods of producing high-quality synthesis gas from gasification processes, especially from indirect gasification technologies such as dual fluidized bed gasification. Desirably, such systems reduce or eliminate the need for extensive downstream cleaning of the synthesis gas produced, allow for production of synthesis gas in the absence of costly air separation unit(s), reduce/eliminate potential byproduct soot formation, and/or provide higher yields of synthesis gas of a desired composition than conventional gasification systems and methods.

SUMMARY

Herein disclosed is a method of producing a high quality synthesis gas comprising less than a desired percentage of non-synthesis gas components, which are components other than hydrogen and carbon monoxide, and a desired mole ratio of hydrogen to carbon monoxide, the method including providing a low quality synthesis gas comprising greater than the desired percentage of non-synthesis gas components; introducing the low quality synthesis gas into a fluid bed conditioner, the fluid bed conditioner one fluidized bed reactor of a dual fluidized bed loop; introducing a flue gas into a fluid bed combustor, wherein the fluid bed combustor is the second fluidized bed reactor of the dual fluidized bed loop; extracting a first catalytic heat transfer stream comprising a catalytic heat transfer material and having a first temperature from the fluid bed conditioner, and introducing at least a portion of the first catalytic heat transfer stream into the fluid bed combustor; extracting a second catalytic heat transfer stream comprising catalytic heat transfer material and having a second temperature greater than the first temperature from the fluid bed combustor, and introducing at least a portion of the second catalytic heat transfer stream into the fluid bed conditioner; extracting a spent flue gas from the fluid bed combustor, wherein the spent flue gas comprises less than 1 vol % oxygen; and extracting high quality synthesis gas comprising the desired percentage of non-synthesis gas components and the desired mole ratio of hydrogen to carbon monoxide from the fluid bed conditioner.

In embodiments, the desired percentage is less than about 20% of non-synthesis gas components. In embodiments, the low quality synthesis gas comprises at least 50,000 mg/Nm$^3$ tar, and the high quality synthesis gas comprises less than about 1 mg/Nm$^3$ tar. In embodiments, the high quality synthesis gas comprises less than about 5 ppmv hydrogen sulfide. In embodiments, the high quality synthesis gas comprises less than about 1 ppmv hydrogen sulfide. In embodiments, the desired mole ratio of hydrogen to carbon monoxide is about 1:1. In embodiments, the method further producing the low quality synthesis gas via gasification of a carbonaceous feed in a gasifier, and the desired mole ratio is obtained by adjusting the amount of steam in the fluid bed conditioner by adjusting the steam fed to the gasifier, the moisture content of the carbonaceous feed, or both. In embodiments, the fluid bed combustor is operated at from 1 to 1.1 times stoichiometric air.

Also disclosed herein is a method for continuous dry reforming by introducing a feed comprising carbon dioxide and at least one selected from methane and propane into a fluid bed conditioner operated at a conditioning temperature, wherein the fluid bed conditioner is one fluid bed of a dual fluidized bed loop and is configured to convert at least a portion of said feed into synthesis gas components; extracting a first catalytic heat transfer stream comprising a catalytic heat transfer material and having a first temperature from the fluid bed conditioner, and introducing at least a portion of the first catalytic heat transfer stream and a flue gas into a fluid bed combustor, wherein the fluid bed combustor is configured to regenerate the catalyst via combustion; extracting a second catalytic heat transfer stream comprising catalytic heat transfer material and having a second temperature from the fluid bed combustor, and introducing at least a portion of the second catalytic heat transfer stream into the fluid bed conditioner; extracting a spent flue gas from the fluid bed combustor, wherein the spent flue gas comprises less than 1 vol % oxygen; and extracting synthesis gas from the fluid bed conditioner.

In embodiments, the catalytic heat transfer material is selected from the group consisting of nickel olivine, silica, nickel alumina, and combinations thereof. In embodiments, the flue gas comprises excess air. In embodiments, the flue gas comprises up to 100 ppmv sulfur dioxide. In embodiments, the spent flue gas comprises less than about 0.5 vol % carbon monoxide. In embodiments, the fluid bed combustor is operated at approximately stoichiometric air.

In embodiments, the dry reforming feed comprises at least 50 ppmv hydrogen sulfide, at least 50,000 mg/Nm$^3$ tar, or both, and the synthesis gas comprises less than 1 ppmv hydrogen sulfide, less than about 1 mg/Nm$^3$ tar, or both. In embodiments, the molar conversion of the carbonaceous components in the feed to synthesis gas is greater than about 90%. In embodiments, the feed comprises at least 30,000 mg/Nm$^3$ tar, and the synthesis gas comprises less than about 200 mg/Nm$^3$ tar. In embodiments, the synthesis gas comprises less than about 1 mg/Nm$^3$ tar. In embodiments, the feed comprises from about 80 ppmv to about 160 ppmv hydrogen sulfide, the flue gas introduced into the fluid bed combustor comprises from about 80 ppmv to about 160 ppmv sulfur dioxide, or both, and the synthesis gas comprises less than about 1 ppmv hydrogen sulfide. In embodiments, the dry reforming feed comprises methane, carbon dioxide, and tar; and the molar conversion of the methane, the carbon dioxide, the tar, or a combination thereof is at least 90%.

These and other embodiments and potential advantages will be apparent in the following detailed description and drawings.

BRIEF DESCRIPTION OF THE DRAWINGS

For a detailed description of the preferred embodiments of the invention, reference will now be made to the accompanying drawings in which.

In the figures, like numbers are utilized to refer to like components.

NOTATION AND NOMENCLATURE

Figure 1:
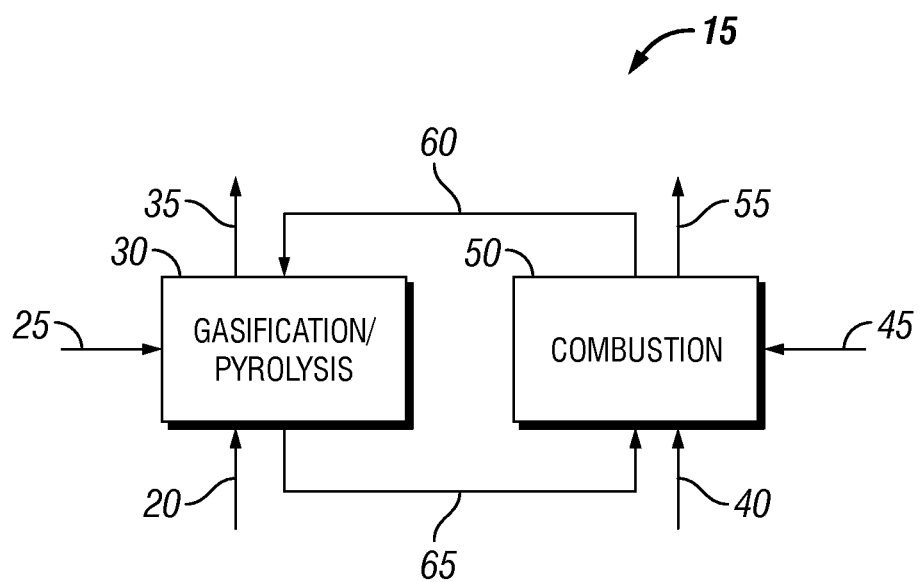
FIG. 1 is a schematic of a dual fluidized bed reactor system.

Unless otherwise stated, concentrations herein are expressed on a volume basis. That is ppm means ppmv, unless otherwise indicated.

'Syngas yield' as used herein is defined as the relative quantity of syngas produced with a minimum molar ratio of $H_2$ to CO required for a particular product application, for a particular quantity of gasifier or conditioner feedstock. For FT liquids production via slurry phase iron catalysis, a claimed increase in syngas yield of 100% for this product application resulting from the proposed conditioner for example would mean doubling the quantity of CO produced assuming sufficient $H_2$ is also produced for the desired equimolar ratio.

As used herein, the 'yield' of FT liquids from a carbonaceous feed material is defined as the ratio of desired product to material feed, typically stated as percent or fraction of material feed and assuming 100% conversion of the carbonaceous feed material. The product is often also described in volumetric units, whereas the feed can be expressed in mass units however under certain assumed standard conditions. For example, a FT liquids plant utilizing biomass as the carbonaceous feed material, the yield of product liquids may be expressed in terms of barrels of liquid product per ton of biomass feed on a moisture free basis.

Use herein of the terms 'hot' and 'cold' when used in reference to circulating fluid streams is meant to refer to relative, rather than absolute, temperatures.

Use herein of the terms 'low' and 'high' when used in reference to the quality of synthesis gas is meant to refer to relative, rather than absolute quality of the synthesis gas. That is, 'low' quality synthesis gas contains a higher content of contaminants (components other than hydrogen and carbon monoxide) than does 'high' quality synthesis gas.

DETAILED DESCRIPTION

Overview.

Herein disclosed are a system and method for conditioning low quality synthesis gas (also referred to herein as syngas'). Via the disclosed system and method, low quality synthesis gas (e.g. 'natural gas' comprising synthesis gas) containing excessive levels of methane, higher hydrocarbons, 'tars', and/or carbon dioxide may be converted into high quality synthesis gas suitable for chemical feedstock applications such as Fischer-Tropsch (FT) processes. The system comprises a dual fluid bed (DFB) conditioner/reformer loop in which an attrition resistant catalytic heat transfer medium is circulated between an endothermic reforming/conditioning/gasification reactor and an exothermic air blown combustion reactor.

The dual fluidized bed conditioning loop 200 described hereinbelow may sometimes be referred to herein as a 'reforming loop', and conditioner 210 may sometimes be referred to herein as a 'reformer'. It is to be understood that, although referred to at times herein as a reforming loop or a reformer, in embodiments the reforming loop and/or reformer promote reactions other than reforming, such as pyrolysis, cracking, partial oxidation and/or shifting. In embodiments, the conditioning reactor may be a steam reforming reactor. The heat transfer medium may comprise a nickel-rich catalytic heat transfer medium, such as nickel olivine, or a more attrition resistant nickel alumina catalyst, or any other fluidizable attrition resistant supported or unsupported (i.e. heterogeneous or homogeneous) catalyst with suitable hydrocarbon and $CO_2$ reforming and CO shift activity. Suitable nickel alumina catalyst is disclosed, for example, in international patent application number PCT/US2005/036588, which is hereby incorporated herein in its entirety for all purposes not contrary to this disclosure. According to embodiments, the hot catalyst endothermically reforms low quality synthesis gas, optionally in the presence of steam, while the combustor exothermally regenerates the circulating catalyst by burning off any residual coke. Supplemental fuel may be utilized in the combustor, if necessary. In this manner, nitrogen in the combustion air proceeds into the combustor flue gas and does not dilute the product synthesis gas, and the bed material of the conditioner is not diluted with ash. The supplemental fuel to the combustor in this DFB reformer loop is preferably any low sulfur gas which supports combustion.

The disclosed DFB reactor concept resembles conventional petroleum refinery fluid catalytic cracking (FCC) technology in some respects and reduces and/or eliminates drawbacks typical of conventional reforming technologies when applied as disclosed to conditioning/reforming of low quality synthesis gas.

System.

FIG. 1 is a schematic of a dual fluid bed loop 15. Dual fluid bed loop 15 comprises a gasification/pyrolysis reactor 30 integrated with a combustion reactor 50. Feed material introduced into gasification/pyrolysis reactor 30 via feed inlet line 25 along with steam introduced via line 20 is gasified (pyrolyzed) in the absence of oxygen or air to produce product gas comprising synthesis gas which may be removed from gasification/pyrolysis reactor 30 via line 35. As gasification/pyrolysis is endothermic, and combustion is exothermic, via dual fluid bed, combustion is integrated with gasification/pyrolysis to maintain a desirable temperature within gasification/pyrolysis reactor 30, and also to remove coke and/or ash from the bed material of gasification reactor 30. Within combustion reactor 50, air and fuel introduced into combustion reactor 50 via lines 40 and 45 respectively are combusted along with coke, tar and other combustible material introduced into combustion reactor 50 with bed material carried over from gasification/pyrolysis reactor 30 via line 65. Flue gas exits combustion reactor 50 via flue gas line 55. The carried-over bed material is heated within combustion reactor 50 by the exothermic combustion reactions and returned to gasification/pyrolysis reactor 30 via convective circulation of the bed material through combustor outlet line 60. As will be discussed in more detail hereinbelow, the system of this disclosure comprises a dual fluid bed loop 15 in which gasification/pyrolysis reactor 30 comprises a conditioner (which, as discussed hereinabove, may be a reformer). To produce low quality synthesis gas to be conditioned, the system disclosed herein may further comprise a second dual fluid bed loop 15 in which the gasification/pyrolysis reactor 30 comprises a gasifier. Heretofore, reforming via a DFB had not been realized.

Figure 2:
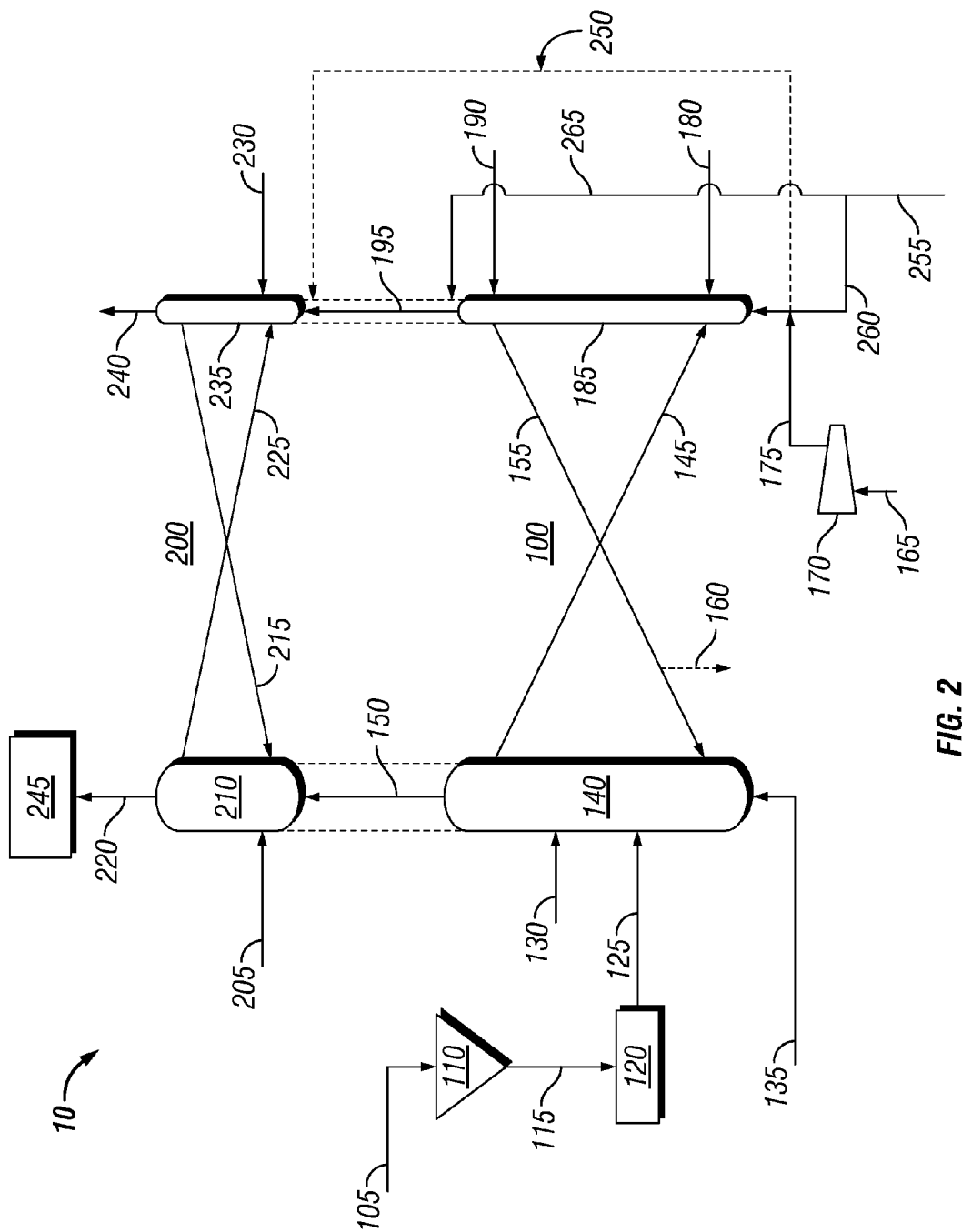
FIG. 2 is a schematic of a dual fluidized bed reactor system according to an embodiment of this disclosure.

FIG. 2 is a schematic of a high-quality synthesis gas production system 10 according to an embodiment of this disclosure. The dual fluid bed system for the production of high-quality synthesis gas according to this disclosure comprises a dual fluidized bed reforming loop 200 (which may also be referred to herein as a secondary dual fluidized bed reformer loop or a secondary dual fluidized bed conditioning loop in embodiments in which low quality synthesis gas to be conditioned via loop 200 is produced via another 'primary' dual fluidized bed loop 100) comprising a conditioner/reformer 210 coupled to a combustion reactor 235. Conditioner 210 is any suitable reformer known in the art. In embodiments, conditioner/reformer 210 is a fluidized bed reformer. Within conditioner/reformer 210, methane, higher hydrocarbons, tars, and $CO_2$ in crude synthesis gas react with steam to produce more hydrogen and carbon monoxide within reformer 210 at the desired mole ratio of $H_2$:CO.

Conditioner inlet line 150 is configured to introduce producer gas comprising gas to be conditioned (i.e. low-quality synthesis gas) into conditioner 210. Producer gas in line 150 may be obtained by any means known in the art. The producer gas in line 150 comprises low-quality synthesis gas. The producer gas may comprise significant amounts of methane, tar, and/or compounds comprising two or more carbons. In embodiments, methane levels in the producer gas may be as high as 10-15 volume percent, $C_2$ and higher hydrocarbon levels may be as high as 5-10 volume percent, $CO_2$ levels may be as high as 5-20 volume percent, and/or tar levels may be as high as 1,000-50,000 mg/$Nm^3$. In embodiments, catalyst activation is substantially maintained at tar concentrations as high as 125,000 mg/$Nm^3$ (over three times that normally reported for a SilvaGas DFB gasifier, for example) with destruction of the tars down to measurable levels of less than or about 1 mg/$Nm^3$ in the high quality synthesis gas produced in the conditioner by reforming into syngas.

In applications, additional material to be reformed is introduced into conditioner/reformer 210 along with producer gas comprising low-quality synthesis gas in line 150. For example, in applications for which the synthesis gas is to be used for the production of liquid hydrocarbons via Fischer-Tropsch, FT tailgas comprising unconverted synthesis gas and other gases may be introduced into reformer 210 along with the producer gas in line 150. Desirably, feed materials (e.g. the crude low-quality synthesis gas in line 150 and recycle tailgas which may be fed via line 205) to conditioner/reformer 210 comprise little or no carbonaceous solids or residual ash, as such materials may, depending on the catalyst, hinder catalyst performance. Depending on the selected catalyst, maximizing concentration of the catalyst in the catalyst bed of conditioner/reformer 210 may enable increased/maintained catalyst performance. Within conditioner 210, steam and carbon dioxide and lighter hydrocarbons such as natural gas (methane) react (e.g. are reformed) to produce additional synthesis gas.

In the embodiment of FIG. 2, bed material from conditioner 210 is circulated around dual fluid bed loop 200 via 'cold' bed material outlet line 225 which introduces 'cold' bed material from conditioner 210 into combustion reactor 235 while 'hot' bed material is returned to conditioner 210 via 'hot' bed material return line 215. As mentioned hereinabove, the terms 'cold' and 'hot' with reference to bed material indicates the temperature of one relative to the other. Although referred to as 'cold', the material therein may be at significant temperatures not normally considered cold, as further discussed hereinbelow.

Suitable circulation rates may be determined in part as a function of the differential temperature of the 'hot' and 'cold' streams. Operation of the DFB(s) may provide a differential temperature in the range of from about 25° F. (16° C.) to about 300° F. (149° C.), and may be about 150° F. (83° C.) in certain applications. The greater the temperature differential, the less material needs to be circulated between the reactors to maintain the endothermic gasifier/conditioner temperatures.

Within combustion reactor 235, flue gas comprising excess air introduced into combustion reactor 235 via flue gas inlet line 195 is combusted, optionally with additional fuel introduced into combustion reactor 235 via, for example, fuel inlet line 230. In embodiments, fuel introduced via line 230 comprises tailgas purge, e.g. Fischer-Tropsch tailgas purge, as discussed further hereinbelow. Flue gas introduced into combustor 235 via line 195 may contain some sulfur dioxide, for example from about 0 to about 50 ppmv, from about 5 to about 40 ppmv or from about 10 to about 30 ppmv $SO_2$. Significant amounts of ash are not expected to be present in secondary conditioner loop 200, providing a potential advantage of incorporating a separate loop. However, any coke and ash remaining in/on the 'cold' bed material is subjected to the combustion conditions within combustor 235 (and inorganic constituents of the ash are oxidized or reduced), heating the bed material therein. Heated/purified bed material (i.e. 'hot' bed material reduced in ash, coke, and/or other contaminants) is returned to conditioner/reformer 210 via 'hot' bed material return line 215. As discussed further herein, fluidized bed combustor 235 may be operable at a temperature in the range of from about 900° C. to about 925° C. or from about 910° C. to about 915° C., and flue gas in line 240 may thus exit combustor 235 at such temperature. This may be referred to herein as the 'regeneration' temperature.

The bed material circulated throughout dual fluid bed loop 200 may comprise any suitable heat transfer medium comprising a catalyst capable of catalyzing reformation of materials such as natural gas and/or carbon dioxide. In embodiments, the bed material comprises an attrition resistant nickel olivine catalyst, such as that developed by the University of Strasbourg (France) and demonstrated for gasifying low sulfur biomass feeds. In applications, the bed material comprises a nickel alumina catalyst. As mentioned hereinabove, suitable catalyst is disclosed in international patent application number PCT/US2005/036588.

In embodiments, the catalyst and/or system is operable at gas sulfide concentrations of up to at least 10 ppm, at least 50 ppm, at least 100 ppm, or at least 200 ppm without substantial loss of nickel catalyst activity or deactivation. In embodiments, the producer gas in line 150 has a sulfur concentration of at least 10, 50, 100, 200, 300, 400, 500, 600, 700, 800, 900, or 1000 ppmv. In embodiments, the hydrogen sulfide concentration in the gas to be conditioned is up to 1000 ppmv, and the catalyst retains at least some activity (although activity will generally be reduced at higher sulfide concentrations). In embodiments, the catalyst and/or system is operable at tar concentrations of at least 50,000 mg/$Nm^3$, 60,000 mg/$Nm^3$, or 70,000 mg/$Nm^3$, without substantial loss of nickel catalyst activity or deactivation. In embodiments, the feed gas in line 150/150A/150A' contains at least 50,000 mg/$Nm^3$, 60,000 mg/$Nm^3$, 70,000 mg/$Nm^3$, or more of tar, and the high quality synthesis gas (i.e. exiting the conditioner) comprises less than about 1 mg/$Nm^3$. In embodiments, the feed to the conditioner of DFB conditioning loop 200/200A comprises substantial amounts of tar, and substantially all of the tar is destructed/converted/reformed to synthesis gas within the DFB. The low quality synthesis gas may comprise greater than about 20 vol %, 25 vol %, 30 vol %, or greater impurities (i.e. non-synthesis gas components). A frequent catalyst regeneration cycle through combustion reactor 235 (i.e. with a regeneration frequency in the approximate range of once every 10 seconds to 60 minutes) contributes to maintaining catalyst activity under what could be considered severely coking conditions. (It is to be understood that circulation of catalytic heat transfer material about DFB conditioning loop 200/200A and circulation of heat transfer material within DFB gasification pyrolysis loop 100/100A, and thus regeneration thereof, is a continuous process.) In comparison, such severely coking conditions are generally impractical for nickel-based tubular steam methane reformers (SMRs) or fixed bed oxygen blown autothermal reformers (ATRs). Depending on the application for which DFB conditioning loop 200 is utilized, suitable operating temperatures and pressures for conditioner/reformer 210 and combustor 235 may be determined as known in the art. In embodiments, conditioner/reformer 210 is operable at a temperature in the range of from about 1000° F. (538° C.) to about 2100° F. (1149° C.). In embodiments, conditioner 210, (210' in FIG. 3 and 210" in FIG. 4 further discussed hereinbelow) is operable at temperatures in the range of from about 1400° F. (760° C.) to about 1900° F. (1038° C.) or in the range of from about 1525° F. (829° C.) to about 1575° F. (857° C.). In some applications, the conditioner/reformer 210 is operable at about 1550° F. (843° C.). Operation of the conditioner at a lower temperature may be desirable, although increased carbon dioxide carryover from combustor 235 may be obtained at lower temperatures. Operation of the conditioner at lower temperatures, in conjunction with reduced circulation rates of catalytic heat transfer material from combustor 235 via hot catalytic heat transfer line 215 may thus be desirable. Conditioner/reformer 210, 210', 210" may be configured for operation in the range of from about 2 psig (0.14 kg/cm$^2$(g)) to about 1000 psig (70.3 kg/cm$^2$(g)). Conditioner/reformer 210, 210', 210" may be configured for operation in the range of from about 2 psig (0.14 kg/cm$^2$(g)) to about 5 psig (0.35 kg/cm$^2$(g)). Conditioner/reformer 210, 210', 210" may be operable at or near ambient conditions. For example, conditioner/reformer 210, 210', 210" may be operable at about 2 psig (0.14 kg/cm$^2$(g)). Alternatively, conditioner/reformer 210, 210', 210" may be operable at higher pressure, for example, a pressure in the range of from about 5 psig (0.35 kg/cm$^2$(g)) to about 1000 psig (70.3 kg/cm$^2$(g)).

Spent flue gas may exit combustion reactor 235 via spent flue gas outlet line 240. The spent flue gas in spent flue gas outlet line 240 may optionally have a temperature different than that of flue gas with excess air in line 195. High-quality synthesis gas produced via conditioner/reformer 210 may exit system 10 via high-quality synthesis gas outlet line 220.

In applications, the system further comprises one or more downstream processing unit(s) 245 downstream of conditioner/reformer 210. Downstream processing unit(s) 245 may be apparatus configured for Fischer-Tropsch conversion, methanol production, or other downstream chemical synthesis operations, as known in the art. In applications, system 10 is utilized to provide synthesis gas of a desired mole ratio of hydrogen to carbon monoxide and a desired purity for use in Fischer-Tropsch conversion. In such applications, downstream processing unit(s) 245 may comprise one or more units selected from scrubber units, waste heat recovery units, caustic scrubbers, compressors, zinc oxide beds, and Fischer-Tropsch reactors. Downstream processing unit(s) 245 may thus comprise one or more Fischer-Tropsch reactors downstream of conditioner 210. In embodiments, the one or more Fischer-Tropsch reactor is operable with an iron-based FT catalyst. In embodiments, the iron-based Fischer-Tropsch catalyst is a precipitated unsupported catalyst. In embodiments, the Fischer-Tropsch catalyst is a catalyst as disclosed in U.S. Pat. No. 5,504,118, U.S. patent application Ser. No. 12/198,459, and/or U.S. patent application Ser. No. 12/207,859, each of which is hereby incorporated herein by reference in its entirety for all purposes not contrary to this disclosure.

Dual fluid bed reformer loop 200 of this disclosure may be utilized for upgrading synthesis gas from any source. For example, the crude low-quality synthesis gas or producer gas in line 150 may be obtained from gasification of a carbonaceous material. The crude low-quality synthesis gas or producer gas may be obtained from gasification of a solid carbonaceous material including but not limited to coal, biomass, woody biomass refuse derived fuel (RDF), and combinations thereof. In embodiments, high-quality synthesis gas production system 10 further comprises apparatus for producing low-quality synthesis gas or producer gas for introduction into dual fluid bed reformer loop 200 via line 150. As shown in the embodiment of FIG. 2, in embodiments, system 10 further comprises a second dual fluid bed loop 100, which is a gasification pyrolysis loop for producing product gas comprising low-quality synthesis gas. In such embodiments, dual fluid bed loop 100 is a primary gasification loop and dual fluid conditioning loop 200 is downstream thereto, i.e. is a secondary loop, and may be referred to herein as a secondary conditioning loop or a secondary reforming loop. Dual fluid bed gasification loop 100 comprises fluid bed gasifier 140 fluidly connected to combustion reactor 185 via 'cold' bed material circulation line 145 and 'hot' bed material circulation line 155.

Gasifier 140 is any fluid bed gasifier suitable for the gasification of a carbonaceous feed material to form a producer gas comprising synthesis gas. Gasifier 140 may contain a bed of and circulated about primary gasification/pyrolysis loop 100 may be heat transfer material selected from silica, olivine, alumina (e.g. alpha-alumina, γ-alumina, etc.), other suitable attrition resistant materials, and combinations thereof. In embodiments, the heat transfer material of DFB loop 100 comprises silica. In embodiments, the heat transfer material of DFB loop 100 comprises alumina. In embodiments, the heat transfer material of DFB loop 100 comprises olivine. Utilization of heat transfer material such as silica enables operation of dual fluid bed gasification loop 100 at high temperature. Bed material may be introduced wherever suitable, for example, a line 190 may be used to introduce makeup bed material to combustion reactor 185. In this manner, undesirables, if present, may be removed from the bed material via combustion. As with combustion reactor 235, combustion reactor 185 may be oxygen-blown or air-blown.

In embodiments, combustion reactor 185 and/or combustion reactor 235 are air-blown, and no air separation unit is required to separate oxygen from air. In embodiments, steam (e.g. low pressure steam) and carbonaceous feed material are introduced into gasifier 140 via steam inlet line 135 and carbonaceous feed inlet line 125, respectively.

Rather than or in addition to introduction into reformer 210 via recycle tail gas reactant line 205, recycle tail gas from downstream Fischer-Tropsch, methanol production, or other downstream chemical synthesis operations in downstream processing unit(s) 245 may be used in place of at least a portion of the low pressure steam in line 135 to a partial or complete extent as required for gasification fluidization velocity requirements as long as sufficient moisture is present in the feedstock in line 125 for gasification and conditioning/reforming purposes. While reducing costly steam consumption, such tailgas recycle could, in applications, be used to minimize associated downstream waste water production. Using this recycle tail gas as a fluidizing transport medium for solid feeds in place of steam could also apply in a similar capacity to other indirect gasification technologies based on stationary tubular heat transfer media. In embodiments, such an alternative indirect gasification technology is used in place of primary pyrolysis loop 100 to provide low grade producer gas comprising synthesis gas for introduction into conditioner 210 via line 150.

In embodiments, an inlet line 130 may connect gasifier 140 with a source of liquid or high sulfur vapor hydrocarbons. Gasifier 140 is operable to convert carbonaceous feed material and optionally liquid or high sulfur vapor hydrocarbons into product gasification or producer gas comprising synthesis gas to be conditioned in conditioner 210. Product outlet line 150 fluidly connects gasifier 140 of primary gasification loop 100 with conditioner 210 of secondary conditioning/reformer loop 200. Line 150 is configured for introduction of gasification product gas comprising low-quality synthesis gas (i.e. producer gas) from any suitable source into conditioner 210.

As gasification requires heat, 'cold' bed material circulation line 145 connects gasifier 140 with combustion reactor 185, whereby a portion of the bed material in gasifier 140 is introduced from gasifier 140 into combustion reactor 185. Combustion reactor 185 is operable such that any unconverted char and ash in the circulated 'cold' bed material (e.g. 'cold' silica) is combusted. Combustion reactor 185 is any combustor suitable for the combustion of unconverted material including char and ash into flue gas in the presence of oxidant and fuel. A flue gas outlet line 195 fluidly connects combustion reactor 185 of primary gasification dual fluid bed loop 100 with combustion reactor 235 of secondary conditioning dual fluid bed loop 200.

Oxidant inlet line 175 and fuel inlet line 180 are connected to combustion reactor 185 for the respective introduction of oxidant and fuel thereto. As mentioned hereinabove with respect to fuel line 230, the fuel may comprise tailgas purge from a Fischer-Tropsch reactor and fuel line 180 may be fluidly connected with a tailgas outlet line of a Fischer-Tropsch reactor of downstream processing unit(s) 245, as will be discussed in more detail with respect to the embodiment of FIG. 6. The oxidant may be substantially-pure oxygen, however air is desirably utilized as oxidant, and no air separation unit or expensive substantially-pure oxygen is utilized. High-quality synthesis gas system 10 further comprises air compressor unit 170 configured to compress air introduced via air inlet line 165 prior to introduction into primary combustor 185 via line 175. As indicated in FIG. 2, a line 250 may be may be utilized to provide oxidant (e.g. air, oxygen, or substantially-pure oxygen) from oxidant inlet line 175 to combustor 235 of conditioning loop 200. However, it may be desirable to pass the oxidant (e.g. air) required in combustor 235 through combustor 185 such that combustor 185 may be operated at a lower temperature by virtue of the resulting higher oxygen partial pressure and thus with less likelihood of the production of undesirables, such as dioxin, $NO_R$, and etc. as well as reduced likelihood of melting of ash constituents and the associated agglomeration and volatilization. Gas turbine exhaust in line 255 comprising substantial oxygen and optionally at elevated temperature may, in embodiments, be introduced into combustor 185 and/or combustor 235 via lines 260 and 265 respectively. Utilization of gas turbine exhaust within combustor 235 and/or combustor 185 may reduce the size required for compressor 170.

'Hot' bed material circulation line 155 connects combustion reactor 185 with gasifier 140, such that heated bed material from which undesirable ash, tar and/or other combustible material has been removed (e.g. 'hot' silica) may be circulated back into gasifier 140. A purge line 160 may be configured to purge unwanted components from primary gasification loop 100 of system 10. Such unwanted components may comprise, for example, ash, sulfate, chloride, or some combination thereof.

Depending on the feed material introduced into high-quality synthesis gas system 10 via carbonaceous feed inlet line 125, system 10 may be configured for the removal of sulfur, halides, or other contaminants from the producer gas. For example, a line 190 may be configured for the introduction of at least one compound into combustion reactor 185. The at least one component may be selected from calcium oxide (lime), magnesium oxide, sodium carbonate, sodium bicarbonate and other alkalis. Suitable metals such as an iron catalyst slurry wax purge produced from a slurry phase Fischer-Tropsch reactor of downstream processing unit(s) 245 may also be introduced into system 10, for example, via line 130, via line 190, or both. While the wax content of the catalyst wax slurry will be pyrolyzed in gasification unit 140, the iron content of the slurry may also contribute to the removal of sulfur, chlorides, and/or other undesirables from the product syngas via, for example, purge stream in purge line 160, and/or spent flue gas in line 240. Addition of spent iron FT catalyst from a FT reactor(s) of downstream processing 245 to the combustor may promote formation of iron oxides (e.g. $Fe_2O_5$) which may react with alkali salts to form $XeFe_2O_4$, which melts at a higher temperature (about 1135° C.), helping to prevent agglomeration. Other additives, such as, but not limited to, limestone, alumina and dolomite may also aid in a similar fashion by providing a higher melting point eutectics (though probably less than 1135° C.).

High-quality synthesis gas production system 10 may further comprise one or more feed processing units. For example, as indicated in the embodiment of FIG. 2, high-quality synthesis gas production system 10 comprises solid feedstock collection bin 110 and screw feeder 120 connected via screw feeder inlet line 115. A bulk feed inlet line 105 may be adapted for introduction of bulk carbonaceous feed into solid feedstock collection bin 110. Solid feedstock collection bin 110 may be a funnel-shaped unit. Screw feeder line 115 is configured for introduction of collected feed into screw feeder 120. Screw feeder 120 is adapted for introduction of carbonaceous feed material into gasifier 140 via carbonaceous feed inlet line 125.

In applications, gasifier 140 of primary gasification dual fluid bed loop 100 operates at a lower temperature than reformer 210 of secondary dual fluid bed conditioning loop 200. In applications, gasifier 140 is operable at a temperature in the range of from about 1100° F. (593° C.) to about 1700° F. (927° C.); alternatively in the range of from about 1200° F. (649° C.) to about 1600° F. (871° C.); alternatively about 1300° F. (704° C.). The generally lower operational range permitted for primary gasification pyrolysis loop 100 may help to promote contaminant capture in purge stream 160 and/or increase the thermal efficiency of the pyrolysis/gasification. The lower operating temperatures and aforementioned sorbent addition suitable for use in primary loop 100 also minimize formation of dioxin and thermal NOx in the flue gas stream exiting primary combustor 185 via line 195. Such lower temperature operation also reduces volatilization of alkali halide salts and eutectic mixtures, which may reduce/prevent deactivation of catalyst in secondary loop 200 and fouling and/or corrosion of downstream equipment. Such lower temperature operation may be particularly advantageous when the aforementioned tubular gasification apparatus or other gasification apparatus is used in place of the dual fluid bed loop 100 depicted in the embodiment of FIG. 2. The capability of loop 100 to operate at lower temperatures for the production of the low quality syngas to be introduced into conditioner 210 via line 150 may reduce the thermal heat transfer duty, metallurgical stresses, and/or the operational severity for such gasifiers (e.g. tubular gasifiers) while similarly improving overall yields of high quality syngas facilitated by shifting at least a fraction of the gasification/reforming duty to secondary conditioning loop 200. The resulting yield of FT liquids is estimated to increase by over 30%, 40%, 50% or more relative to a base case with an indirect tubular gasifier without the proposed conditioner/reformer. A substantial capital cost reduction for such gasifiers (e.g. tubular gasifiers) may thus also result when integrated in this manner with DFB conditioning loop 200.

High-quality synthesis gas production system 10 may further comprise heat recovery/synthesis gas cooling unit(s)

and/or one or more conventional caustic scrubbers downstream of secondary dual fluid bed conditioning/reforming loop 200. The caustic scrubber(s) may be adapted for removing substantially all of any residual low levels of carbonyl sulfide and/or other acid gases such as $H_2S$ from the high-quality synthesis gas in high quality synthesis gas outlet line 220. In embodiments, more than 99.9% of the carbonyl sulfide or other acid gas(es) is removed to provide a scrubbed high-quality synthesis gas.

In embodiments, separation of bed material from the reactor overheads of conditioner/reformer 210, (secondary) combustor 235 and, when present, from gasification reactor 140, and (primary) combustor 185 is provided by suitable gas/solid separation units. Thus, in applications, system 10 will comprise at least one, at least two, at least three or at least four gas/solids separation units. Such gas/solids separation units may be positioned on bed material transfer lines 225, 215, 145, 155, or a combination thereof. In embodiments, system 10 comprises one or a plurality of cyclones to effect gas/solid separation. In applications, a candle filter(s) is (are) used rather than or in series with a cyclone(s). Candle filters may be capable of a finer degree of particle separation (although this may be unnecessary in embodiments) and may also have a lower height requirement than cyclones, thereby possibly minimizing the height requirements of the various reactors (i.e. 210, 235, 140 and/or 185).

Figure 3:
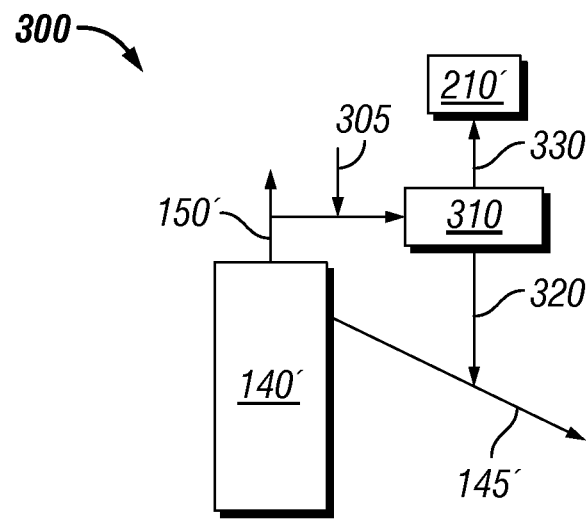
FIG. 3 is a schematic of a configuration suitable for desulfurization of (removal of undesirably high amounts of sulfur from) the gasification product gas according to embodiments of this disclosure.

Therefore, in embodiments in which primary dual fluid bed gasification loop 100 produces low-quality synthesis gas to be conditioned, a gas/solids separation unit may be positioned between the primary loop 100 and the secondary dual fluid bed conditioning/reforming loop 200. The gas/solid separation unit may be any effective solid/gas separation device known in the art. For example, suitable devices include, but are not limited to, cyclones, filters and candle filters. FIG. 3 is a schematic of a configuration 300 suitable for the removal, according to embodiments of this disclosure, of undesirably high amounts of sulfur and/or other contaminants should they be present in the gasification/pyrolysis product gas produced in gasifier 140. In configuration 300, gas/solids separation unit 310 is positioned between gasifier 140' and conditioner/reformer 210'. Line 150' is configured to introduce at least a portion of the gasification product in outlet line 150' of gasifier 140' into gas/solids separation unit 310. Line 305 may be configured for introducing a contaminant removal agent, for example a sulfur-removal agent, into gas/solids separation unit 310. The sulfur-removal agent may be lime or limestone, or, if the amount of sulfur-containing compounds is adequately low, may be a more expensive sulfur-removal agent, such as sodium carbonate. Line 330 is adapted to introduce cleaned up low-quality synthesis gas having the desired reduced level of contaminant (e.g. less than 100 ppmv sulfide) into conditioner/reformer 210'. Line 320 is configured for introduction of gas/solids separation unit-extracted material into cold bed material circulation line 145' or line 145 in the embodiment of FIG. 2. A higher degree of contaminant (e.g. sulfur and/or halogen) removal than would otherwise occur in the primary gasification pyrolysis loop may be effected in this manner due to the higher mass transfer driving force resulting from the higher effective concentration of contaminant removal agent when introduced in this manner as compared to introduction into gasifier 185 via, for example, material inlet line 190. In embodiments, conventional candle filters are used as the one or more gas/solids separation devices associated with the gasifier and/or combustor of the primary loop 100. When candle filters are utilized, contaminant removal agents (e.g. sulfur and/or halide removal agents) may tend to form a temporary layer on the surface of the filters. This concentrated layer of such sorbent agents would tend to further promote contaminant (e.g. sulfur and/or halide) removal. The layers would then be periodically discharged as a solid underflow stream 320 as depicted in FIG. 3 as the candle filter undergoes normal periodic 'back flow' regeneration to discharge accumulated solids when excessive levels accumulate. In embodiments, one or more candle filter is utilized for gas/solid separation. A candle filter operable with a back flow medium of pressurized syngas may be positioned on primary gasifier 140 and/or a candle filter operable with a back flow medium of compressed air may be positioned on primary combustor 185.

Figure 4:
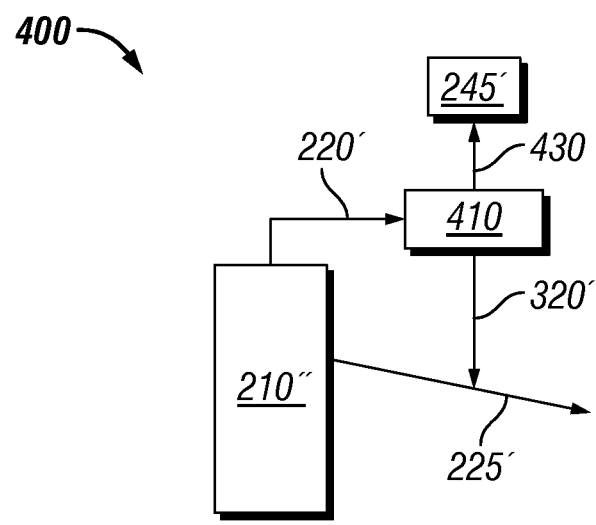
FIG. 4 is a schematic of a secondary tar reforming configuration according to an embodiment of this disclosure.

In applications, high quality synthesis gas production system 10 further comprises a secondary tar reforming stage. FIG. 4 is a schematic of a secondary tar reforming configuration 400 according to an embodiment of this disclosure. In this embodiment, conditioner/reformer 210" is fluidly connected with secondary tar reformer 410, via high quality synthesis gas outlet line 220'. A solids line 320' may be configured to introduce removed solids into cold bed material circulation line 225' or line 225 of FIG. 2. Line 430 may carry product synthesis gas from secondary reformer 410 to downstream processing unit(s) 245'. As mentioned hereinabove, in embodiments, the system disclosed herein is utilized to provide synthesis gas of a desired mole ratio of hydrogen to carbon monoxide and of a desired purity for use in Fischer-Tropsch conversion. In such applications, downstream processing unit(s) 245' may comprise one or more units selected from scrubber units, waste heat recovery units, caustic scrubbers, compressors, zinc oxide beds, and Fischer-Tropsch reactors, such units known in the art.

Secondary tar reformer 410 may be any unit suitable for reforming tar, and may or may not also provide reforming of methane and/or other hydrocarbons. In applications, secondary tar reformer 410 comprises a catalytic candle filter. Secondary tar reformer 410 may be a nickel-lined catalytic candle filter, as described, for example, in Ind. Ingo. Chem. Res. 2007, 46, 1945-1951. The nickel catalyst could be in the form of a substantially permanent nickel lining on a ceramic substrate or in the form of a 'sandwiched' inner layer of nickel-based catalyst sandwiched between a suitable membrane and a ceramic filter body. A potential disadvantage of such a catalytic candle filter(s) with a permanent catalytic lining is that, not only may periodic regeneration with oxygen be required, but a spare filter may also be required for periods during which the primary filter is undergoing such regeneration. Incorporating a conventional candle filter without a permanent catalytic nickel lining in the came capacity as indicated in FIG. 4 may effectively achieve some degree of secondary tar removal due to the anticipated formation of a temporary layer of fine particles of circulating Ni catalyst recovered from conditioner/reformer 210". As mentioned, the temporary nickel catalyst layer would then be periodically discharged as a solid underflow stream via solids line 320' as depicted in FIG. 4 as the candle filter undergoes normal periodic or pulsed 'back flow' regeneration to discharge accumulated solids once accumulated to excessive levels. The efficient integration of a conventional candle filter with secondary conditioning/reformer loop 200 in this manner may thus effectively achieve the tar destruction advantages claimed for a catalytic candle filter with a catalytic nickel lining but without the potential disadvantages of such a catalytic candle filter unit with a permanent Ni lining.

As indicated by the dashed lines in FIG. 2, in embodiments, the primary and secondary units can also be structurally integrated to further reduce costs, with the shells of the secondary units mounted on top of the shells of the corresponding primary units. For example, in embodiments, primary gasifier 140 may be structurally integrated with secondary conditioner/reformer 210; primary combustion unit 185 may be structurally integrated with secondary combustion unit 235; or both.

Figure 5:
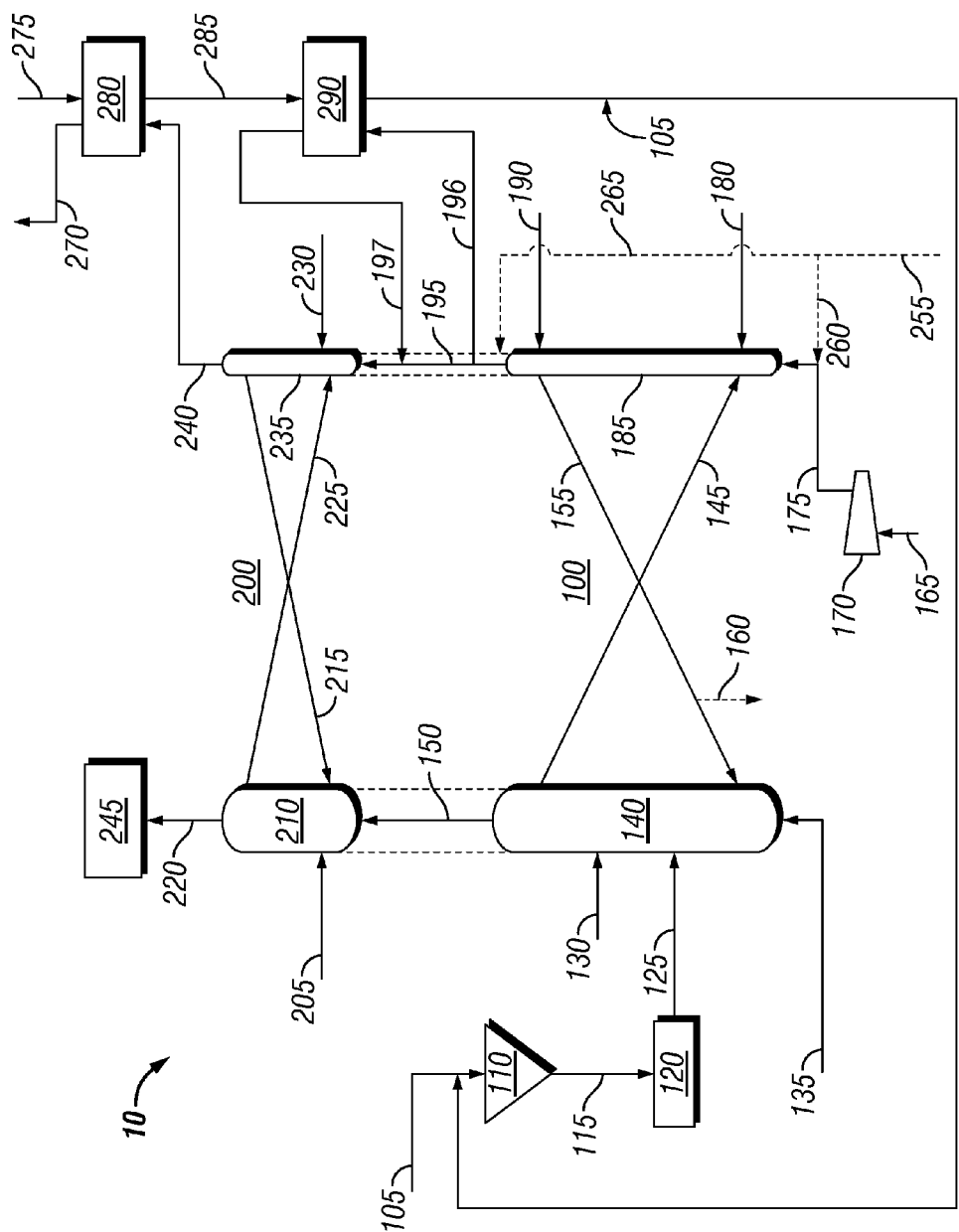
FIG. 5 is a schematic of the dual fluidized bed reactor system of FIG. 2 in which a drying system has been incorporated according to an embodiment of this disclosure.

The DFB conditioning loop 200 of this disclosure may optionally be integrated with a two stage feed drying system. FIG. 5 is a schematic showing the DFB gasification system 10 of FIG. 2 incorporating a two stage drying system. In the embodiment of FIG. 5, spent flue gas line 240 is directed to a first drying stage 280. Wet feed is introduced via line 275 into first drying stage 280. Within first drying stage 280, heat transfer from hot spent flue gas 240 (which may have a temperature in the range of from about 1700° F. (927° C.) to about 300° F. (149° C.)) to the wet feed dries the feed. In embodiments, the wet feed introduced into first drying stage via line 275 has a moisture content in the range of from about 30 wt % to about 60 wt %, from about 35 wt % to about 55 wt %, or from about 40 wt % to about 50 wt % moisture/water. First drying stage 280 is followed by a second drying stage 290. Serial drying stages 280 and 290 may comprise conventional rotating drum type dryers. Line 196 connects flue gas with excess air line 195 with drying stage 290, whereby at least a portion of the hot flue gas exiting combustor 185 via line 195 is introduced into second drying stage 290. Second drying stage 290 is configured to transfer heat from hot flue gas in line 195 to partially dried feed material exiting first drying stage 280 via line 285, thus further drying the partially-dried feed material therein. Line 270 may carry reduced temperature spent flue gas out of drying stage 280. Line 197 connects second drying stage 290 with line 195 whereby reduced temperature flue gas and volatile organic compounds (VOCs) from second drying stage 290 are introduced into combustor 235. Desirably, the temperature of the gas in line 197 is close to the operating temperature of combustor 235. In embodiments, the temperature of the gas in line 197 is greater than about 300° F. (149° C.), greater than about 1000° F. (538° C.), greater than about 1500° F. (816° C.). Line 105 connects drying stage 290 with gasifier 140, optionally via solid feedstock collection bin 110 and/or screw feeder 120. First drying stage 280 may be operable to produce a partially dried feed material in line 285 having a moisture content in the range of from about 10 wt % to about 25 wt %, from about 12 wt % to about 28 wt % or from about 15 wt % to about 25 wt %. Second drying stage 290 may be operable to produce a dried feed material in line 105 having a moisture content in the range of from about 5 wt % to about 10 wt %, from about 5 wt % to about 20 wt % or from about 0 wt % to about 20 wt %. The degree of feed drying may be adjusted, as discussed further herein, to provide a desired steam content in conditioner 210, and thus a desired ratio of $H_2$:CO in the high quality syngas exiting conditioner 210 via high quality syngas outlet line 220. Maintaining low oxygen concentration levels in flue gas streams 240 and 196 (i.e. below about 5 to about 10 vol %) should prevent premature ignition of dried biomass in streams 285 and 105. The capability of maintaining such low oxygen concentration levels may thus be another inherent advantage of the proposed conditioning concept. The drying equipment may consist of conventional rotating drum vessels or fluid bed vessels typically used for such drying service.

Figure 6:
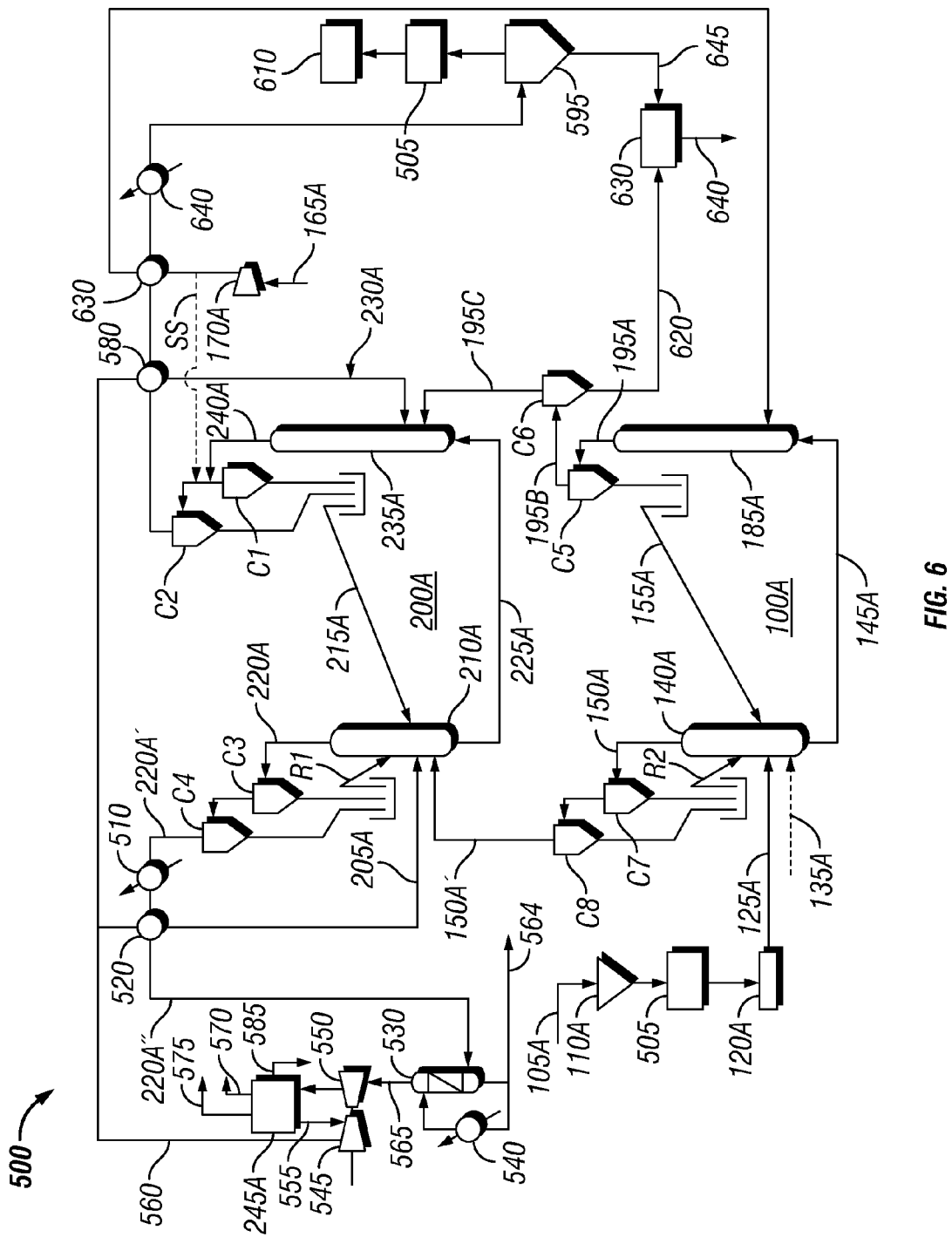
FIG. 6 is a schematic of another dual fluidized bed reactor system according to an embodiment of this disclosure.

In embodiments, a DFB conditioning loop 200 of this disclosure comprises a lower loop seal (LLS), as disclosed in Patent Application Pub. No. WO2009/021258, the disclosure of which is hereby incorporated herein in its entirety for all purposes not contrary to this disclosure. FIG. 6 is a process flow diagram of a DFB conditioning loop 200A according to an embodiment of this disclosure. In the embodiment of FIG. 6, DFB conditioning loop 200A is integrated with downstream FT processing apparatus comprising FT reactor 245A, and low quality synthesis gas is provided via primary gasification loop 100A. In this embodiment, DFB conditioning loop 200A comprises conditioner 210A and combustor 235A. Line 150A' provides producer gas comprising synthesis gas to conditioner 210A. High quality synthesis gas exits conditioner 210A via high quality synthesis gas exit line 220A. Cyclones C3 and C4 may be utilized to remove any solids from high quality synthesis gas in line 220A. A line R1 may be configured to return any removed solids to conditioner 210A. A line 220A' may introduce gas exiting cyclone C4 into heat exchanger 510 which may be configured to produce steam from boiler feed water via heat exchange with gas in line 220A'. Heat exchanger 520 may be configured on line 220A' for transfer of heat from gas in line 220A' to FT tailgas in line 205A. A line 220A" may be configured to introduce reduced-temperature high quality synthesis gas into scrubber 530, which may be a caustic scrubber. Scrubber 530 may be adapted to cool the synthesis gas to a temperature down to about 100° F. (38° C.), thereby polishing the synthesis gas prior to FT conversion. As caustic scrubbers may be sensitive to ppb sulfur, the herein disclosed synthesis gas conditioning may be optimal for preparing synthesis gas upstream of such a caustic scrubber, which may be an expensive plant component. A line 564 may transport waste water from scrubber 530, and a line 565 may be configured to introduce synthesis gas from scrubber 530 via compressor 550 into FT reactor 245A. Line 575 may be fluidly connected with FT reactor 245A for removal of FT product hydrocarbons therefrom. A line 570 may be fluidly connected with FT reactor 245A for removal of medium pressure (MP) steam from FT reactor 245A. A line 585 is configured for removal of wastewater from FT reactor 245A. A line 555 is adapted for removal of FT tailgas from FT reactor 245A. Line 555 may introduce FT tailgas to expansion turbine 545 from which reduced pressure FT tailgas is provided to FT tailgas line 560. In applications, FT expansion turbine 545 is adapted to provide a substantial portion (e.g. from at least about 70-80%) of the power required for compression of synthesis gas in compressor 550 upstream of FT reactor 245A. A supplemental conventional steam expansion turbine operating on HP and or MP steam could provide the balance of the power requirements for syngas compressor 550. In embodiments, a portion of FT tailgas may be introduced via line 560 (optionally via heat exchanger 520) and line 205A into conditioner 210A, and/or a portion of FT tailgas may be introduced via line 560 (optionally via heat exchanger 580) and line 230A into combustor 235A. A line 240A may be configured for transport of spent flue gas from combustor 235A optionally through cyclones C1 and C2, heat exchanger 580, heat exchanger 630, boiler 640, baghouse 595, and drying 505 [dryer 505 is shown twice in FIG. 6 for simplicity, i.e. the flue gas from the baghouse can be used to perform the drying in this embodiment] to stack 610. Heat exchanger 580 may be configured for transfer of heat from spent flue gas in line 240A to FT tailgas in line 230A to heat the FT tailgas for introduction into combustor 235A. Heat exchanger 630 may be positioned downstream of compressor 170A and may be configured for transfer of heat from spent flue gas in line 240A to compressed air in line 165A. Line 240A may also be connected with boiler 640 for the production of steam from boiler feed water via heat transfer with spent flue gas. Utilization of primary/secondary cyclone pairs (C1/C2, C3/C4, C5/C6, C7/C8) may enable reduction in attrition, and/or increased solids recovery by allowing operation of the primary cyclones at lower velocities than the corresponding secondary cyclone of the pair.

In embodiments, system 500 further comprises a primary DFB gasifier loop 100A for the production of synthesis gas to be conditioned within secondary DFB conditioning loop 200A. Primary DFB gasifier loop 100A comprises a gasifier 140A and a combustor 185A. Gasifier 140A and combustor 185A are fluidly connected via hot heat transfer circulation line 155A and lower loop seals (LLS) 145A. Hot heat transfer circulation line 155A is configured for transfer of hot heat transfer material from combustor 185A to gasifier 140A. LLS 145A is configured for transfer of cold heat transfer material from a lower portion of gasifier 140A to a lower portion of combustor 185A. Lower loop seals 225A and 145A may be designed substantially as described in Patent Pub. No. WO2009/021258, which is incorporated herein by reference in its entirety for all purposes not contrary to this disclosure. In embodiments, a line 165A may provide air via compressor 170A and optionally heat exchanger 630 to combustor 185A. Line 195A may introduce flue gas from combustor 185A into cyclone C5, configured to remove solids from the flue gas in line 195A. Hot heat transfer material circulation line 155A is configured to introduce solids from cyclone C5 and combustor 185A into gasifier 140A. Line 150A is configured to introduce producer product gas comprising synthesis gas produced in gasifier 140A, optionally via cyclones C7 and C8 into conditioner 210A. A line R2 is configured to return solids removed from the gas in line 150A via cyclones C7 and/or C8 to gasifier 140A. Line 195B may be configured to introduce solids-reduced flue gas into a cyclone C6 which is configured for further solids removal from the flue gas produced in combustor 185A. In this manner, ash may be removed from the flue gas via cyclones C5 and/or C6. Line 620 may connect cyclone C6 with an ash handling system 630, whereby ash removed via cyclone C6 may be introduced into ash handling system 630. A line 645 may be configured for introduction of ash removed in baghouse 595 into ash handling system 630. A line 640 may be configured for removal of ash fines from system 500. A slipstream SS may fluidly connect air inlet line 165A (or 165 in the embodiment of FIG. 2) with an overhead of combustor 235A (combustor 235 in the embodiment of FIG. 2), such that a small slipstream of preheated air feed from compressor 170A (170 in the embodiment of FIG. 2) may be introduced into a gas/solids separation device C2, and any residual carbon monoxide burned off as facilitated by the presence of the residual particulate catalyst, without oxidizing the bulk of catalyst in stream 215A.

System 500 may further comprise feed handling apparatus configured for preparation of feed for introduction into gasifier 140A. In the embodiment of FIG. 6, feed handling apparatus comprises collection bin 110A, drying apparatus 505 and screw feeder 120A. Any combination of these feed handling apparatus, or any other combination known in the art may be utilized to prepare a carbonaceous feed material for introduction into gasifier 140A. A line 105A is configured for introduction of carbonaceous feed material into gasifier 140A, optionally via solid feedstock collection bin 110A, drying apparatus 505 and screw feeder 120A. The carbonaceous feed material introduced into gasifier 140A may have a moisture content in the range of from about 0 to about 60 wt % moisture, from about 10 wt % to about 40 wt % moisture, or from about 10 wt % to about 30 wt % moisture. The feed material may have a moisture content of about 21 wt % moisture if no supplemental live steam is used for fluidization. A one or two stage drying apparatus as described with respect to FIG. 5 may be utilized to dry a carbonaceous feed material to a desired moisture content. Gasifier 140A is configured for the gasification of feed. A line 125A may introduce carbonaceous material into gasifier 140A.

While an embodiment of system 10 comprising a dual fluid bed conditioning/reformer loop downstream of a primary dual fluid bed gasifier loop has been described in detail herein, similar high thermal efficiency can be obtained with a producer gas provided via a gasifier operable by another type of 'indirect' gasification technology in which air is indirectly used as a gasification (combustion) agent without diluting the product synthesis gas with the nitrogen content of the air and resulting flue gas. Gasifiers operating via various indirect gasification technologies may be integrated with dual fluid bed conditioning loop 200. Yield improvement (e.g. 30% or greater) in terms of high quality syngas production and the resulting increased FT product yields may result when a dual fluid bed conditioning loop 200 as disclosed is applied to synthesis gas and flue gas effluents from these various technologies, similar to the yield improvement provided by integration of DFB conditioning loop 200 with DFB gasification loop 100 as depicted in the embodiment of FIG. 2 and described in detail herein. Integration of the dual fluid bed reformer loop 200 as disclosed to various indirect gasification technologies may enable the use of gasification feeds containing higher amounts of sulfur via addition of a desulfurizing agent (e.g. a lime-based desulfurization agent) to a (e.g. fluid bed) gasifier. For example, in embodiments, the feed to gasifier 140 may comprise more than 0.5, 5.0, or 10.0 wt % sulfur in embodiments.

Similarly, the dual fluid bed conditioning loop 200 of this disclosure may be integrated with a gasifier operating via more conventional 'direct' gasification technology for the similar purpose of upgrading the quality of (i.e. conditioning) the synthesis gas produced, as long as the low quality synthesis gas (for introduction into DFB loop 200 via line 150 in the embodiment of FIG. 2 and line 150A in the embodiment of FIG. 6) has a sufficiently low sulfur content. Such gasifiers based on fluid beds may be integrated with a dual fluid bed reformer loop 200 of this disclosure allowing gasification of higher sulfur feedstocks (introduced thereto via line 125 in FIG. 2 and line 125A in the embodiment of FIG. 6) via addition of a desulfurizing agent (e.g. a lime-based desulfurizing agent) to the gasifier.

Method.

A method of producing high-quality synthesis gas according to this disclosure will now be described with reference to FIG. 2. The method comprises introducing a low-quality synthesis gas or 'produced' gas into a conditioner/reformer 210 of dual fluid bed conditioning/reformer loop 200. By introducing the conditioner feed as a hot gas, reforming may be increased relative to introduction of a cold gas and/or introduction of a hot or cold solid-containing feed (i.e. at least partly solid) directly to reformer/conditioner 210. When utilizing cold, solid feeds, the particles must be broken down, pyrolyzed/volatilized, and then reformed/conditioned. Introducing a hot gas as feed to conditioner 210 speeds up the reforming/conditioning process and increases thermal efficiency relative to using a gas which must first be cooled for processing as required by other proposed conditioning technologies. Desirably, the feed to the conditioner comprises a substantially homogeneous gas/vapor feed.

Within reformer 210, carbon dioxide, C2+ compounds, and/or methane in the producer gas introduced thereto via line 150 are reformed to produce high-quality synthesis gas. Any reformable low sulfur hydrocarbon bearing vapor or gas may be used to supplement the low quality synthesis gas as feed to reforming/conditioning reactor 210, including for example unconverted tail gas from a Fischer-Tropsch reactor. In instances in which the method is utilized to produce high-quality synthesis gas for Fischer-Tropsch conversion, therefore, Fischer-Tropsch tailgas may also be introduced into reformer 210 via, for example, a FT tailgas inlet line 205.

Reforming is endothermic. To maintain a desired reforming temperature, bed material is circulated to and from combustion reactor 235. A catalytic heat transfer material is circulated throughout dual fluid bed conditioning/reformer loop 200. The material circulated throughout DFB conditioning loop 200 is attrition resistant fluidizable heat transfer material. Desirably, the material is a catalytic material with reforming capability. The catalytic heat transfer material may be supported or unsupported. In embodiments, the catalytic heat transfer material is an engineered material. In embodiments, the catalytic heat transfer material is not engineered. In embodiments, the catalytic heat transfer material comprises a nickel catalyst. In embodiments, the catalytic heat transfer material comprises a supported nickel catalyst. In embodiments, the catalytic heat transfer material comprises a nickel olivine catalyst. In embodiments, the catalytic heat transfer material comprises a supported silica. In embodiments, the catalytic heat transfer material comprises a nickel alumina catalyst. In embodiments, the catalytic heat transfer material is an engineered nickel alumina catalyst. The catalytic heat transfer material may have a particle size distribution in the range of from about 100 microns to about 800 microns, from about 100 to about 600 microns, from about 100 to about 300 microns, about 200 or 100 microns.

In embodiments, the catalytic heat transfer material comprises an engineered alumina support material, which may be from about 10 to about 100 times more attrition resistant than olivine. Such an engineered nickel alumina catalyst may also have a higher heat capacity than olivine. In embodiments, reforming is thus performed with an engineered catalytic support material. In embodiments, the catalytic support material has a high sphericity, wherein the sphericity is defined as the ratio of the surface area of a sphere having the same volume as the particle to the actual surface area of the particle, such that a perfectly spherical particle has a sphericity of 1.0. In embodiments, the sphericity of the engineered support material and/or the catalytic heat transfer material is greater than about 0.5, 0.6, 0.7, 0.75, 0.85, 0.9, or greater than about 0.95. Such an engineered catalytic heat transfer material may be less prone to binding (i.e. flow more readily) throughout DFB conditioning loop 200/200A (e.g. in cyclone down pipes, cyclone diplegs, and/or in recirculation lines) than non-engineered (i.e. natural) catalytic heat transfer materials (such as olivine-supported materials). Such high sphericity engineered support materials may not only promote reduced particle attrition within a DFB but may also reduce erosion of reaction system components such as refractory, metallic walls, piping, heat exchanger tubing and/or other components. Additionally, the engineered (e.g. engineered alumina) support material may have a higher hardness (e.g. at least about 9.0 on the Mohs scale compared with 6.5 to 7 reported for olivine) and/or high heat capacity (at least about 0.20 cal/gK at 100° C.) relative to that of natural support materials (e.g. olivine). In embodiments, the catalytic heat transfer material comprises a support having a material density of about 3.6 g/cc. Alpha alumina may be selected over other types of alumina such as gamma alumina because alpha alumina is harder than gamma alumina on the Mohs scale. In embodiments, the BET surface area of the support material is at least about 0.50 $m^2$/g for supported Ni catalyst applications. In embodiments, the nickel content of the catalytic heat transfer material is in the range of from about 1.5 to about 9 wt %. In applications, the catalytic heat transfer material comprises about 6 wt % nickel. In applications, the nickel content of the catalytic heat transfer media is substantially less than the typical nickel content of conventional Ni reforming catalysts. In applications, non-supported (homogeneous) Ni based particulate fluidization catalysts based on silica and other substrates are utilized.

If an alumina support material is used as heat transfer media in the primary gasification pyrolysis loop 100/100A (discussed hereinbelow), a lower BET surface area may be desired, as this may tend to further harden the material, providing greater attrition resistance.

The use of an alumina based support material in the primary gasification pyrolysis loop 100/100A, discussed in detail hereinbelow, would reduce the possibility of agglomeration due to the presence of sodium and/or potassium typically present in biomass feed. The use of silica based support material (sand) or silica containing materials such as natural olivine would tend to form lower melting point eutectics than that of alumina in the presence of sodium and/or potassium, and may thus be less desirable for use in certain applications.

In embodiments, during start-up, thermal activation of an initial batch of catalytic heat transfer material (e.g. a Ni alumina catalyst, for which thermal activation may be performed primarily to decompose residual nitrate content) is effected in situ within secondary combustor 235/235A without the need for a separate dedicated activation vessel. Such initial activation may comprise maintaining minimum excess air and/or oxygen levels below 1-2% in spent flue gas line 240/240A as start-up temperatures exceed 900° F. (482° C.). The reformer/conditioner may be maintained under reducing conditions via a slight hydrogen feed until normal operating feed is introduced after the dual fluid bed reactors have gradually attained normal operational temperatures (of approximately 1550° F. (843° C.) in the conditioner and approximately 1670° F. (910° C.) to 1700° F. (927° C.) in the combustor). Conventional natural gas and/or propane fuel can be introduced via fuel/tailgas purge line 230 for start-up purposes to gradually elevate system temperatures.

The continuous oxidative regeneration of the catalytic bed material (e.g. engineered nickel alumina catalyst) in combustor 235 within a desired elevated temperature range also helps to promote resistance of the circulating reforming catalyst to poisoning by residual sulfur compounds which may be present in gasifier/conditioner feed 150 or combustor feed 195. In embodiments, the catalyst utilized as heat transfer material in DFB loop 200 is operable (i.e. retains at least some level of activity) at levels of residual sulfur compounds at least as high as 50, 75, 100, 200, 300, 400, 500, 600, 700, 800, 900 or 1000 ppmv. In embodiments, the catalyst utilized as heat transfer material in DFB loop 200 is operable (i.e. retains at least some level of activity) at levels of residual sulfur compounds at least as high as several hundred ppmv. Generally, as the level of sulfur increases, the activity decreases, as will be discussed further hereinbelow.

In embodiments, reformer/conditioner 210/210'/210"/210A is operated with $H_2S$ levels of up to at least 50, 75, 80, 90, 100, 150, 200, 300, 400, 500, 600, 700, 800, 900, or up to at least 1000 ppmv while maintaining at least some catalyst activity as determined by methane conversion. In embodiments, the reformer/conditioner is operated with $H_2S$ levels of at least about 150 ppmv, while maintaining substantial catalyst activity. Substantial catalyst activity may comprise methane conversion levels of at least about 50, 75, 90, 95, 96, 97, 98, 99, or substantially 100%. In embodiments, substantial catalyst activity is maintained on a continuous basis for a duration of at least 1, 2, 3, 4, or several hours. In embodiments, catalyst activity lost at high operating levels of sulfur is at least partially regenerated when high sulfur levels in the conditioner or the combustor of or throughout DFB conditioning loop 200/200A are discontinued.

Relatively 'cold' bed material is extracted from conditioner/reformer 210 via cold bed material circulation line 225 and introduced into combustion reactor 235. The extracted bed material may comprise uncombusted material, such as coke and unoxidized ash. Within combustion reactor 235, the coke, ash, and/or any other combustible material are combusted with flue gas comprising excess air which is introduced into combustion reactor 230 via flue gas inlet line 195. In embodiments, air/oxidant is introduced into combustor 235 via line 250 which may introduce air directly into combustor 235 or may introduce additional oxidant (e.g. air) into the flue gas 195 exiting combustor 185. Fuel is introduced into combustion reactor 235 via fuel inlet line 230. The fuel may comprise, for example, tailgas purge from a Fischer-Tropsch reactor of downstream processing unit(s) 245. Spent flue gas exits combustion reactor 235 via spent flue gas outlet line 240. Heated bed material is circulated from combustion reactor 235 to conditioner 210 via hot bed material circulation line 215. This circulation of bed material throughout dual fluid bed conditioning loop 200 serves to maintain a desired temperature within conditioner/reformer 210 (i.e. provide heat thereto via heat transfer with hot circulated materials) and remove unwanted combustible material from the product synthesis gas exiting conditioner 210 via high quality synthesis gas outlet line 220.

In embodiments, the concentration of $H_2S$ in conditioner feed stream in line 150 is at least twice as high as the concentration of $SO_2$ in flue gas line 195. In embodiments, conditioner feed stream introduced into conditioner 210 via line 150 has a concentration of $H_2S$ of about 100 ppmv and the concentration of $SO_2$ in the flue gas introduced into combustor 235 is about 20 ppmv. In embodiments, the total weight of sulfur in the conditioner is approximately the same as the weight of sulfur in the combustor of DFB conditioning loop 200/200A. In embodiments, combustor unit 235 is operable/ operated in the presence of about 0-200 ppmv, about 0-100 ppmv, or about 20-100 ppmv $SO_2$ in the flue gas feed introduced thereto via line 195, for example, while the reformer/ conditioner of DFB conditioning loop 200/200A is able to maintain high activity (e.g. at least about 65, 70, 80, 90, 95, or about 97% catalytic activity).

It should be noted that, in embodiments, not only is the reformer/conditioner operable in the presence of $H_2S$ as described above, but this unit may also effectively remove substantially all of the $H_2S$ down to measurable levels of less than about 10, 5, 4, 3, 2 or 1 ppmv in high quality synthesis gas produced therein (e.g. product gas in line 220), transferring effective sulfur levels to the combustor 235/235A from which, depending on concentration, it may be released via spent flue gas 240 as $SO_2$. This may effectively eliminate a need for or reduce size requirements of an $H_2S$ removal system (e.g. a dedicated $H_2S$ removal system) downstream of the conditioner 210/210A/210'/210" and/or upstream of an FT reactor(s) of downstream processing apparatus 245. In embodiments of the herein disclosed method, therefore, a downstream $H_2S$ removal step is absent. Additionally, since $SO_2$ is less toxic than $H_2S$ and the volume of spent flue gas is generally higher than the volume of high quality synthesis gas, no or reduced size/complexity abatement apparatus or method steps may be needed downstream of combustion/ combustor 235 to meet local $SO_2$ emissions regulations, depending on jurisdiction. If further $SO_2$ abatement is required, such abatement may, in embodiments, be achieved by dry or wet limestone scrubbing, which may be less costly and/or sensitive to impurities than other forms of conventional $H_2S$ removal from the high quality syngas product. As known in the art, byproduct of dry or wet scrubbing (e.g. calcium sulfate) may be sold for use in the production of various materials, including, but not limited to sheet rock. Sulfide is more likely to represent the form of sulfur recovery from the gasifier/conditioner; such sulfide may be converted to sulfate in the combustor.

As mentioned hereinabove, the high quality synthesis gas may comprise less than 5, 4, 3, 2, or 1 mg/Nm³ or substantially no tar, while the feedgas to the conditioner may comprise greater than 10, 20, 30, 40, 50, 60, 70, 80, 90, 100, 110, 120, 130, 140 or 150 g/Nm³ tar. In embodiments, substantially all of the tar introduced into the conditioner is converted to synthesis gas.

In embodiments, the feed gas to the conditioner comprises greater than 5, 10, 15, 20, or vol % impurities and the high quality syngas product leaving the conditioner comprises less than 20, 15, 10 or 8 vol % impurities (i.e. non-synthesis gas components).

In embodiments, reformer/conditioner 210/210A/210'/ 210" is operated at a temperature in the range of from about 1100° F. (593° C.) to about 1600° F. (871° C.), from about 1500° F. (816° C.) to about 1600° F. (871° C.), or from about 1525° F. (829° C.) to about 1575° F. (857° C.) and combustor 235/235A is operated at a temperature in the range of from about 1600° F. (871° C.) to about 1750° F. (954° C.), from about 1625° F. (885° C.) to about 1725° F. (941° C.), or from about 1650° F. (899° C.) to about 1700° F. (927° C.).

High-quality synthesis gas product may be removed from conditioner/reformer 210 via high-quality synthesis gas outlet line 220. In embodiments, the high-quality synthesis gas comprises low amounts of methane, low amounts of carbon dioxide, and/or low amounts of inerts. In embodiments, the high-quality synthesis gas comprises less than about 20, less than about 10, or less than about 5 volume percent carbon dioxide. In embodiments, the high-quality synthesis gas comprises less than about 10, 5, or 1 volume percent inerts such as nitrogen. In embodiments, the high-quality synthesis gas comprises less than about 10, 7, or 5 volume percent methane. In embodiments, the high-quality synthesis gas comprises hydrogen and carbon monoxide in a desired mole ratio. In embodiments, the high-quality synthesis gas comprises hydrogen and carbon monoxide in a mole ratio in the range of from about 0.5:1 to about 2:1; alternatively, in the range of from about 0.5:1 to about 1.5:1; alternatively a mole ratio of about 1:1; alternatively a mole ratio of $H_2$:CO greater than about 1:1. In applications, the high-quality synthesis gas is suitable for use in Fischer-Tropsch conversion. In embodiments, the high-quality synthesis gas produced in dual fluid bed conditioning loop 200 requires little or no contaminant removal prior to introduction into a Fischer-Tropsch reactor of downstream processing unit(s) 245. In applications, the high-quality synthesis gas is suitable for direct introduction into a Fischer-Tropsch reactor. In embodiments, $H_2S$ and $CO_2$ levels are sufficiently low that the high-quality synthesis gas is not introduced into an acid gas removal unit prior to introduction into a Fischer-Tropsch reactor of downstream processing unit(s) 245.

The desired $H_2$:CO mole ratio and the desired conversion levels of methane, higher hydrocarbons, carbon dioxide, and tars are primarily achieved by controlling the amount of steam and/or residual water vapor in the feed, (e.g. provided in a biomass feed introduced via carbonaceous feed inlet line 125) introduced into the conditioner with the synthesis gas via line 150 and/or by controlling the operating temperature within conditioner 210. The reforming temperature is ultimately controlled by controlling the rate of circulation of the heat transfer media from combustor 235, while controlling the flow of fuel and/or air or other oxidant to combustor 235 as necessary to maintain a desired combustor temperature.

In embodiments, a DFB conditioning loop 200/200A is operable/utilized for continuous 'dry reforming' of methane with $CO_2$ (e.g. a 50/50 molar mix). In embodiments, dry reforming is performed in the presence of tars with substantially no evidence of catalyst deactivation and with high (e.g. 90-95+%) molar conversion of the methane, $CO_2$, and tars. In embodiments, a DFB conditioning loop 200/200A is utilized for efficient dry reforming of propane. In dry reforming embodiments, the molar ratio of $H_2$:CO in the conditioned syngas product may be adjusted to a level of about 1:1 by adjusting the water vapor content of the feed to conditioner 210/210'/210"/210A introduced via line 150/150A. Numerous sources and types of hydrocarbons can be efficiently converted to high quality syngas with a desired molar ratio of $H_2$:CO by varying the steam to carbon molar ratio (i.e. by adjusting steam addition and/or the degree of drying of the carbonaceous feed introduced (e.g. introduced into line 150/150A) to reformer/conditioner 210/210'/210"/210A without substantial catalyst deactivation and/or coking.

As discussed hereinabove, the amount of steam in conditioner/reformer 210 may be controlled to provide a high quality synthesis gas having a desired composition (e.g. a desired mole ratio of hydrogen to carbon monoxide) and/or a desired degree of tar removal. In applications, the mole ratio of steam (or residual water vapor) to carbon in conditioner 210 is maintained in the range of from about 0.1 to 1. To produce a synthesis gas having a higher mole ratio of hydrogen to carbon dioxide, a mole ratio of steam to carbon may be near the higher end of the range, with more steam being utilized/introduced to conditioner 210. In embodiments, the desired mole ratio of hydrogen to carbon monoxide in the high quality synthesis gas is about 1:1. In such embodiments, the mole ratio of steam to carbon in reformer 210 may be in the range of from about 0.3 to about 0.7; alternatively, in the range of from about 0.4 to about 0.4; alternatively about 0.5. As discussed in more detail hereinbelow, in embodiments, a primary gasification/pyrolysis loop 100 is used to provide low quality producer gas for introduction into conditioner 210 via line 150. The amount of steam (e.g. low pressure steam having a pressure in the range of from about 25 to about 100 psig or (1.76 to about 7.03 kg/cm$^2$(g)) introduced into gasification unit 140 via steam inlet line 135 may be adjusted to control the ratio of steam to carbon in conditioner 210. Alternatively or additionally, Fischer-Tropsch tailgas may be utilized in addition to some of the steam for fluidization purposes, reducing the amount of steam ending up in conditioner 210. The use of such tail gas or product synthesis gas to minimize steam consumption may be particularly advantageous when the aforementioned 'indirect' tubular gasification technologies are used to produce the feed(s) for DFB conditioning loop 200 in place of the dual fluidized bed reactors of primary DFB loop 100. In such embodiments, a substantial reduction in steam consumption and associated waste water production may occur when such tubular gasification technologies are used rather than the dual fluidized beds of primary loop 100. Alternatively or additionally, the amount of water in the carbonaceous feed material introduced into gasification unit 140 via carbonaceous feed inlet line 125 may be adjusted to alter the steam to carbon ratio in conditioner 210.

As mentioned hereinabove, in embodiments, the disclosed method further comprises forming producer gas for introduction into conditioner/reformer 210 via line 150. Forming of producer gas may be by any means known in the art. However, in an embodiment, the producer gas is formed via the use of a second dual fluid bed loop. In this embodiment, dual fluid bed conditioner/reformer loop 200 is applied as a higher temperature 'secondary' DFB reformer loop which receives the corresponding effluent hot gases from a lower temperature primary DFB gasification pyrolysis loop 100. As mentioned hereinabove, lower temperature primary DFB gasification loop 100 may gasify any suitable carbonaceous feed, including, but not limited to, biomass (e.g. woody biomass RDF feed), municipal sludge, coal, petroleum coke, and combinations thereof. As indicated in FIG. 2, in such embodiments, the secondary conditioner 210 is in series with primary gasifier 140 while secondary combustor 235 is in series with primary combustor 185. In embodiments, an attrition resistant catalytic (e.g. nickel-based alumina or olivine) DFB conditioning loop is applied to reforming a poor quality synthesis gas produced by a 'primary' DFB gasifier, rather than being applied directly to gasification of carbonaceous feedstock comprising substantial amounts of solids.

In primary gasification loop 100, endothermic primary gasifier 140 pyrolyzes a carbonaceous feed material into low quality synthesis gas in the presence of a suitable fluidizing gas such as steam and/or recycled synthesis gas and/or FT tailgas. In embodiments, use of hydrogen rich feed promotes lower temperature combustion in fluid bed combustor 185/185A (e.g. in the range of from about 900° F. (482° C.) to about 1100° F. (593° C.)) than would normally be enabled with hydrocarbon feeds. Thus, in embodiments, hydrogen rich tail gas from an Fischer-Tropsch type unit(s) of downstream processing apparatus 245/245A is introduced via fuel/tailgas purge line 180 to facilitate lower temperature operation of combustor 185/185A of a lower temperature primary gasification pyrolysis loop 100/100A.

The carbonaceous feed material may be primarily solid, primarily liquid, primarily gaseous, or may contain any combination of solid, liquid and gaseous carbonaceous materials. In embodiments, the carbonaceous feed is in the form of a slurry. In applications, the carbonaceous feed material introduced into gasifier 140 via carbonaceous feed inlet line 125 comprises or is derived from RDF, municipal sludge, biomass, coal, petroleum coke or a combination thereof. Suitable processed municipal sludge comprises, for example, E-FUEL™, available from Enertech, Atlanta, Ga. In applications, the carbonaceous feed comprises primarily RDF. In embodiments, bulk feed material is introduced into a feedstock (e.g. an at least partially solid feedstock) collection bin 110. Feed may be introduced into a screw feeder 120 via a line 115. The carbonaceous feed material is introduced into gasifier 140 of primary gasification dual fluid bed loop 100 via carbonaceous feed material inlet line 125. As mentioned hereinabove, liquid or high sulfur vapor hydrocarbons may be introduced into gasifier 140 via line 130. In this manner, high sulfur-containing materials may be converted to synthesis gas, and the sulfur effectively removed from the high-quality synthesis gas.

Any unconverted char produced in gasifier 140 is oxidized with oxidant (e.g. air) in exothermic primary combustor 185. As shown in FIG. 2, routing all of the system combustion air requirements through primary combustor 185 may be used to promote complete combustion in primary combustion reactor 185, even though the combustor is desirably operated at lower temperatures than combustor 235. In embodiments, however, a portion of oxidant (e.g. air) from line 175 is routed directly to combustor 235, for example via line 250. Primary loop 100 utilizes any suitable circulating heat transfer medium to transfer heat from primary combustor 185 to gasifier 140. As mentioned hereinabove, the heat transfer medium may be silica, olivine, alumina, or a combination thereof. The introduction of excess air into primary combustor 185 via air inlet line 165, air compressor 170, and compressed air line 175, permits operation of combustor 185 at lower temperature while achieving high char combustion. Such lower operating combustion temperature may help suppress production of undesirables, such as, but not limited to, thermal NOx and/or dioxin production and reduction thereof in the flue gas which ultimately exits system 10 via spent flue gas outlet line 240. The lower temperature operation of primary dual fluid bed gasification loop 100 permits enhanced contaminant removal, as mentioned hereinabove. The poorer 'low' quality synthesis gas produced in gasification unit 140 is reformed in secondary conditioning loop 200, providing 'high quality' synthesis gas of a desired composition (e.g. having a desired $H_2$:CO mole ratio and/or a desired purity). In applications, operation of secondary combustor 235 at a higher temperature than primary combustor 185 permits combustion of any residual hydrocarbons carried over from primary dual fluid bed loop 100, including highly toxic hydrocarbons such as dioxins and PCBs which may be present.

In embodiments, combustor 235 is operated with less than about 5, 4, 3, 2, 1, or 0.5 volume percent oxygen and/or under 2, 1, or 0.5 vol % carbon monoxide in spent flue gas stream 240. In embodiments, combustor 235 is operated with less than about 1 vol % oxygen and less than about 0.5 vol % carbon monoxide in spent flue gas stream 240. In embodiments, combustor 235 is operated with approximately (e.g. slightly above) stoichiometric air. In embodiments, low excess oxygen levels are utilized to prevent/minimize carryover of oxygen in catalytic heat transfer material (e.g. with Ni catalyst) exiting combustor 235/235A via line 215/215A to the reformer/conditioner of DFB conditioning loop 200/200A. Such excess oxygen is not desirable because it leads to increased levels of $CO_2$ in the high quality syngas in line 220/220A (which must be removed prior to certain applications requiring chemical grade synthesis gas) and also reduces synthesis gas yield (defined as moles of CO plus $H_2$). Reducing circulation rates between the reactors of DFB conditioning loop 200/200A may also be utilized to prevent undesirable oxygen carryover. Quite unexpectedly, a DFB system originally designed for oxygen carryover has been successfully applied herein to an application in which oxygen carryover is undesirable.

In embodiments, another advantage of operating with the substantially zero excess air consumption enabled by secondary combustor 235/235A in secondary conditioning loop 200/200A is more complete utilization of the unconverted excess air in the flue gas exiting primary combustor 195/195A of the primary gasification pyrolysis loop 100/100A, as typified by more conventional indirect gasifier concepts such as that of SilvaGas and Clearfuels. Not only does this potentially minimize the size and/or power consumption of air compressor 170/170A and associated processing equipment, such operation may also reduce pollutant production (e.g. NOx and/or dioxin production) within spent flue gas leaving the system via line 240/240A compared with prior art systems. In embodiments, an 'induced draft' fan may be positioned and operated downstream of scrubbing and/or processing equipment operating on spent flue gas line 240/240A. The high efficiency of flue gas oxygen utilization in secondary combustor 235/235A may also facilitate efficient use of other low grade flue gas sources as a supplemental feed to primary combustor 185/185A and/or secondary combustor 235/235A. Such supplemental feed may comprise exhaust gas from a gas turbine, for example, which may comprise substantial amounts of oxygen and may be introduced from a gas turbine exhaust line 255 fluidly connected via line 265 and/or line 260 into secondary combustor 235/235A and/or primary combustor 185/185A. Such exhaust gas may be introduced 'hot', reducing energy requirements.

If the feed to primary gasifier 140 contains significant levels of sulfur and/or halogen (e.g. chlorine), a suitable contaminant-removal compound, such as limestone, dolomite or calcined lime (CaO), and/or sodium carbonate, may be added to primary loop 100 to prevent excessive levels of contaminant compounds (e.g. sulfur and/or halogen) from contaminating the effluent gases in conditioner inlet line 150 entering secondary conditioning loop 200. The resulting byproduct (e.g. calcium sulfate and/or calcium halide) along with any ash introduced with the primary loop gasification feed via carbonaceous feed inlet line 125 may be purged from the heat transfer medium leaving primary combustor 185 in 'hot' bed material circulation line 155, for example, via purge line 160. Capturing chlorine, via, for example, use of a nickel alumina catalyst or other suitable material, in the primary DFB gasification pyrolysis loop 100 reduces the likelihood of dioxin production.

As mentioned hereinabove and indicated in FIG. 3, if the gasifier effluent gases exiting gasifier 140/140'/140A via outlet line 150/150'/150A comprise a contaminant (e.g. sulfur) level greater than desirable/suitable for the catalytic heat transfer material in reformer 210/210'/210A (e.g. a sulfide level greater than 50-1000 ppmv, inclusive), at least a portion of the product gas in line 150/150'/150A may be introduced along with contaminant removal agent (e.g. sulfur-removal compound), which may be introduced via concentrated contaminant removal agent makeup line 305, into a gas/solids separation unit 310. Low-quality synthesis gas, which may comprise sulfur below a desired level, may then be introduced into conditioner/reformer 210/210'/210A via line 330. Extracted compounds and contaminant removal agent may be introduced into combustion reactor 185 of primary dual fluid bed gasification loop 100 by introduction, via line 320, into cold bed material circulation line 145/145', recycle line R2, or LLS 145A.

In applications, overhead gas from combustion unit 185/185A is treated via concentrated lime makeup stream 305 by introduction of overhead gas from primary combustor 185/185A into gas/solids separation unit 310 (when unit 310 is used in primary combustor overhead service) along with introduction thereto of overhead gas from gasification unit 140/140'/140A via line 150/150'/150A (when used in the primary gasifier overhead service). That is, device 310 can be used overhead of either the primary gasifier or primary combustor in the primary pyrolysis loop as previously described and/or it can be used as a secondary halide or sulfide impurity recovery device for either the gasifier or the combustor. If a candle filter is used for this application, back-pulsing can be performed with either syngas or air depending on reactor service.

As mentioned hereinabove and indicated in FIG. 4, if the conditioner effluent gases exiting reformer 210/210'/210"/210A via outlet line 220/220'/220A comprise an undesirable level of tar, at least a portion of the product gas may be introduced into a secondary conditioner/reformer 410. Within secondary reformer 410, tar is reformed. Solids are removed via secondary reformer outlet line 320' and may be introduced into cold bed recirculation line 225/225', solids return line R1 or LLS 225A. Product synthesis gas is removed from secondary reforming unit 410 via line 430. The product synthesis gas may be introduced into downstream processing unit(s) 245/245'/245A, which, as mentioned hereinabove, may comprise apparatus for any process utilizing synthesis gas for operation. Such downstream processes include, but are not limited to, FT conversion, methanol production, and other chemical synthesis operations. Such downstream production apparatus may include, without limitation, one or more scrubber units, waste heat recovery units, caustic scrubbers, compressors, zinc oxide beds, Fischer-Tropsch reactors, and combinations thereof.

As discussed hereinabove with respect to FIG. 5, the overall gasification design configuration consisting of two separate loops (100/100A and 200/200A) also facilitates drying of biomass feed with a relatively high moisture content to a relatively low level of moisture, as may be needed for a particular product application, by enabling the implementation of a corresponding two stage drying system. The two stage drying utilizes exit flue gases 195/195C and 240/240A from combustors 185/185A and 235/235A, respectively to dry the feed. In embodiments, biomass feed comprises from about 40 to about 50 wt % moisture and is dried via two-stage drying to provide a dried feed having a moisture content in the range of from about 5 to about 20 wt %. Wet fresh biomass is introduced via line 275 into a drier of first drying stage 280 operated with spent flue gas 240/240A from combustor 235/235A to dry the biomass. The first drying stage may produce a partially dried feed comprising, for example, from about 20 to about 25 wt % moisture. In embodiments, first drying stage 280 removes about 15 to 35 wt % of the moisture from the fresh feed introduced thereto via line 275. The partially dried biomass leaving first drying stage 280 is introduced via line 285 into a dryer of second dryer stage 290. Second dryer stage 290 operates on flue gas 195/195C from primary combustor 185/185A (which may be diverted from and reintroduced into line 195/195A via lines 196 and 197, respectively) to complete drying down to a desired level. In embodiments, stage two drying 290 provides a dried feed in line 105 having a moisture content in the range of from about 5 wt % to about 20 wt % moisture. In embodiments, second stage drying 290 removes about 5 to about 15 wt % of the moisture from the partially dried feed introduced thereto via line 285. Dried feed may be introduced into gasifier 140/140A via line 105/105A and optionally feedstock collection bin 110/110A and/or screw feeder 120/120A.

The flue gas stream exiting the second drying stage in line 197 feeds into secondary combustor 235/235A and thus any residual VOCs volatilized into the dryer effluent stream are oxidized within secondary combustor 235/235A. This may eliminate/reduce the need to condense and recover such VOCs from the flue gas leaving the second drying stage in a complex and costly system requiring extensive heat transfer equipment. Drying the biomass feed (or other carbonaceous feeds with generally excessive moisture levels, such as lignite or sewage sludge) to the maximum extent possible may be particularly advantageous for IGCC power applications where any excess feed moisture would not only detract from the system thermal efficiencies but also ultimately add to the waste water disposal requirements.

Another method of producing high-quality synthesis gas according to this disclosure will now be described with reference to FIG. 6. According to this embodiment, DFB conditioning loop 200A comprises a conditioner 210A fluidly connected with a combustor 235A via a hot catalytic heat transfer materials circulation line 215A and a lower loop seal 225A. Within conditioner 210A, low quality synthesis gas introduced via line 150A to a lower portion of conditioner 210A is conditioned to provide a high quality synthesis gas stream, which exits conditioner 210A via high quality synthesis gas exit line 220A. Catalytic heat transfer material is transferred via lower loop seal 225A to combustor 235A, within which impurities such as ash and char carried over to the combustor with the catalytic heat transfer material via lower loop seal 225A are combusted in the presence of excess oxidant (e.g. excess air) to heat the catalytic heat transfer material. Flue gas comprising excess air provides the oxidant to combustor 235A. Additional fuel, such as FT tailgas, may be introduced via line 230A and combusted within combustor 235A as necessary to provide a desired operating temperature within combustor 235A and a desired temperature of the catalytic heat transfer material transferred back to conditioner 210A via hot heat transfer circulation line 215A.

The low quality synthesis gas conditioned within conditioning loop 200A may be provided via utilization of a second DFB or primary gasification loop 100A. In this embodiment, synthesis gas to be conditioned (e.g. for FT processing) is produced via a primary gasification loop 100A. Carbonaceous feed materials are introduced via line 105A and optionally feedstock collection bin 110A, drying apparatus 505 and screw feeder 120A into gasifier 140A. Within gasifier 140A, the carbonaceous feed materials are gasified/pyrolyzed, optionally with the addition of steam via steam inlet line 135A, to produce producer gas containing synthesis gas.

In such embodiments, synthesis gas to be conditioned is provided by gasifying a carbonaceous feed material in a gasifier of a DFB gasification loop. Carbonaceous feed material is gasified in gasifier 140A to provide low quality synthesis gas product stream 150A. The low quality synthesis gas may be passed through cyclones C7 and/or C8 prior to introduction into conditioner 210A. Solids removed via centrifugation in cyclones C7 and/or C8 are returned to the gasifier 140A. Gasifier 140A is in fluid communication with a combustor 185A. Cold heat transfer material from gasifier 140A is transferred to combustor 185A via lower loop seal 145A. Within combustor 185A, impurities, such as ash and char, are burned off of the heat transfer material in the presence of oxidant (e.g. air), raising the temperature of the heat transfer material and providing the heat required for the endothermic gasification reactions within gasifier 140A. The oxidant for combustor 185A may be provided by oxygen, substantially-pure oxygen or, perhaps most desirably, air. Air in line 165A may be compressed via compressor 170A and heated via heat exchange with spent flue gas in line 240A within heat exchanger 630 prior to introduction into combustor 185A. Flue gas produced in combustor 185A exits combustor 185A via flue gas line 195A. The flue gas may be passed through cyclone C5 and optionally cyclone C6 for removal of solids prior to introduction via line 195C into combustor 235A. Hot heat transfer materials from combustor 235A are returned to gasifier 140A via hot heat transfer circulation line 155A, providing heat for gasification in gasifier 140A.

The incorporation of a lower loop seal between the combustor and the gasifier for both the primary pyrolysis loop 100A and the secondary conditioning loop 200A may facilitate solids circulation within the respective loops by eliminating the need to pass all circulating solids through overhead cyclones or other solids recovery devices for both the gasifier (conditioner) as well as the combustor fluidly integrated therewith. If, for example, all solids are passed overhead through the combustor cyclones, solids recovery from the gasifier can occur via the lower loop seal. While reducing solids attrition, such a solids circulation mode may also improve the dynamic stability control of the DFB system by minimizing the possibility of catalyst inventory depletion of one reactor of the DFB relative to the other. The more stable system pressure profiles potentially provided thereby may allow reduction in the heights of the respective cyclone solids recovery down pipes and thereby also allow minimization of the heights of the respective combustion and gasification reactors.

Addition of a small slip stream SS of preheated air feed from compressor 170/170A to an inlet of a solids separator (e.g. secondary cyclone C2) operating on flue gas 240/240A from secondary combustor 235/235A may be incorporated to promote oxidation of any residual carbon monoxide to desirable levels. This may be feasible for the small quantity of carbon monoxide present in the presence of the residual levels of Ni Alumina catalyst fines. While oxidizing the carbon monoxide to acceptable levels, this also avoids exposing the bulk of the Ni alumina catalyst recovered in the primary cyclone C1 to excessive oxygen levels.

Ash removed via cyclone C6 may be introduced to ash handling system 630, from which ash fines are removed via line 640. In embodiments utilizing a nickel DFB (or NiDFB), some loss of supported Ni catalyst from the NiDFB reactor loop 200 is expected to occur due to attrition. As discussed herein, the catalyst fines resulting from such attrition can be recovered from the baghouse(s) 595, cyclones (e.g. 310 and C1-C8), candle filters (optionally 310), scrubbers and/or other suitable filtration or recovery systems. Some synthetic or engineered catalyst support materials, such as CoorsTek alumina for example, may be recyclable following appropriate processing. Such processing may involve, for example, the addition of appropriate binder material to reagglomerate the fines and spray drying to reconstitute the originally desired particle size distribution. In embodiments, the desired particle size distribution is in the range of from about 100 to about 800 microns, from about 100 to about 600 microns, from about 100 to about 400 microns or from about 100 to about 300 microns. The reconstituted support material could subsequently undergo the usual processing for Ni catalyst addition to render it reusable and recyclable as catalyst to the Ni DFB system. While minimizing the process make-up requirement for fresh catalyst material, which may be costly, such catalyst reconstitution may also help minimize the potential disposal burden of spent nickel-contaminated catalyst. Such recycling could represent another advantage of utilizing/selecting an engineered catalyst support material rather than a conventional material such as natural olivine which may not be recyclable in this manner.

In embodiments, the high quality synthesis gas produced via DFB conditioning loop 200A, optionally from low quality synthesis gas produced via DFB gasification loop 100A, is utilized for FT production of liquid hydrocarbons. In such embodiments, high quality synthesis gas produced via conditioning loop 200A is introduced into one or more FT reactors 245A. High quality synthesis gas in line 220A may be passed through cyclones C3 and/or C4, boiler 510, heat exchanger 520, scrubber 530 and/or compressor 550 prior to introduction into FT reactor(s) 245A. Solids removed from the high quality synthesis gas via cyclones C3 and/or C4 may be returned to conditioner 210A via line R1. Boiler feed water may be converted to steam within boiler 510. Passage of high quality synthesis gas through heat exchanger 520 may cool the high quality synthesis gas and heat FT tailgas for introduction into combustor 235A. Impurities may be condensed from the high pressure synthesis gas via scrubber 530, and waste water may be removed from scrubber 530 via a line 564. Compressor 550 may raise the pressure of the high quality synthesis gas to about 450 psig prior to introduction into FT reactor(s) 245A.

FT reactor(s) 245A is operated to produce FT liquids, which exit FT reactor(s) 245A via FT product line 575. Wastewater and steam may be removed from FT reactor(s) 245A via lines 585 and 570 respectively.

Within expansion turbine 545, expansion of tailgas extracted from FT reactor(s) 245A via FT tailgas line 555 is utilized to provide power, for example for compression of high quality synthesis gas within compressor 550. Byproduct MP steam 570 can be produced in the FT reactor, and may be available for various purposes such as driving steam expansion turbines. In embodiments, FT tailgas exiting FT reactor(s) 245A via line 555, optionally via expansion turbine 545 and line 560 may be utilized within conditioner 210A and/or combustor 235A. Supplemental HP or MP steam may be used to drive a steam expansion turbine on a common drive shaft with syngas expansion turbine 545 and syngas compressor 550 to make up the balance of the syngas compressor power requirements. In such embodiments, a portion of the FT tailgas is introduced via lines 560 and 205A into conditioner 210 to produce additional synthesis gas and/or a portion of the FT tailgas is introduced as fuel via lines 560 and 230A into combustor 235A. In embodiments, a portion of the FT tailgas is passed through heat exchanger 520 for increasing the temperature thereof via heat transfer with high quality synthesis gas exiting conditioner 210A via line 220A' prior to introduction into conditioner 210A via line 205A. In embodiments, a portion of the FT tailgas is passed through heat exchanger 580 for increasing the temperature thereof via heat transfer with spent flue gas in line 240A prior to introduction into combustor 235A via line 230A.

Spent flue gas from combustor 235A may be introduced into baghouse 595, optionally via heat exchanger 580, heat exchanger 630, and boiler 640 (from which steam may be produced from boiler feed water, BFW). Ash removed via baghouse 595 may be sent to ash handling 630 and solids-removed flue gas from baghouse 595 may be sent, optionally via drying apparatus 505, to stack 610.

Desirably, the circulating heat transfer media in both continuous regenerative DFB loops 100/100A and 200/200A (e.g. catalytic heat transfer medium in secondary conditioner loop 200 and silica, olivine and/or alumina heat transfer medium in primary gasification loop 100/100A) are operated independently of one another, whereby cross contamination of any catalysts, heat transfer media, adsorbents, and/or other additives is minimized. Each continuous regenerative loop 100/100A and 200/200A may therefore be optimized to maximize individual performance levels and individual feedstock flexibility of the respective loop, while achieving the important thermal efficiency advantage of integrated hot gas processing, an industry first.

By utilizing primary gasification and secondary conditioning, gasification may be operated at lower temperatures than conditioning (e.g. reforming). In this manner, greater amounts of undesirables, e.g. sulfur-containing components, may be absorbed and removed via the lower temperature primary gasification loop. Such absorption of undesirables tends to work better at reduced temperatures. The primary gasification stage should thus perform more efficiently and reliably at lower operating temperatures with regard to sulfur capture and other parameters as described in this disclosure, with concomitant increased flexibility/range of suitable carbonaceous feedstocks.

In embodiments, substantially all (up to 99.9%) of any residual low levels of carbonyl sulfide and/or other acid gases such as $H_2S$ remaining in the high-quality synthesis gas exiting conditioning loop 200/200A in high quality synthesis gas outlet line 220/220A may be removed downstream of secondary conditioner loop 200/200A via a conventional caustic scrubber, optionally following heat recovery 510 and gas cooling 520.

While an embodiment of the invention has been described in which the dual fluid bed conditioner loop 200/200A of this disclosure is applied as a secondary loop to a primary dual fluid bed gasifier loop 100/100A, the method of producing high-quality synthesis gas via dual fluid bed conditioner loop 200/200A can be integrated with similarly high thermal efficiency with other types of 'indirect' gasification technologies in which air is indirectly used as a gasification (combustion) agent without diluting the synthesis gas produced with the nitrogen content of the air and resulting flue gas. These other types of indirect gasification technologies include biomass (e.g. low sulfur biomass) to Fischer-Tropsch liquids (BTL) applications. Substantial BTL yield improvement may result if the conditioning method disclosed herein is similarly applied to the synthesis gas and flue gas effluents from these technologies. Gasification feeds comprising higher levels of sulfur may be utilizable if a desulfurizing agent (e.g. a lime-based desulfurizing agent) is added to the selected gasifier (e.g. a fluid bed gasifier).

The dual fluid bed conditioning disclosed herein may also be advantageously applied to more conventional 'direct' gasification technologies for the similar purpose of upgrading the quality of the synthesis gas produced, as long as the synthesis gas has a suitable sulfur content. Direct fluid bed gasification technologies may also be capable of gasifying higher sulfur feedstocks if it is also feasible to add a desulfurizing agent (e.g. a lime-based desulfurizing agent) to the gasifier.

By integrating the disclosed dual fluid bed conditioning method with existing biomass to liquids (BTL) and/or coal to liquids (CTL) applications, large yield and cost improvements may be realized. The system and method disclosed herein allow hot gas processing, eliminating the need for costly low temperature or cryogenic processes and apparatus.

Features/Advantages.

In an embodiment of this disclosure, a lower temperature primary gasification loop 100/100A pyrolyzes, de-ashes, desulfurizes and dehalogenizes low quality carbonaceous feedstocks while a higher temperature secondary conditioning loop 200/200A efficiently reforms the resulting methane, higher hydrocarbons, and any $CO_2$ into high quality synthesis gas. The conditioning (e.g. reforming) reactions occur more efficiently in the absence of unconverted solid feedstock or associated ash residues which could hinder the efficient gas phase mass transfer and kinetics of the reforming reactions. Both DFB loops are continuously and independently regenerated via segregated oxidant-blown (e.g. air-blown) combustion of the respective circulating heat transfer and/or catalytic media of that loop. The serial hot gas processing configuration of the corresponding primary and secondary reactors maximizes thermal efficiencies therein, while substantially reducing or even eliminating the need for intervening heat transfer equipment. Based on simulations of reformer loop 200/200A, segregating and optimizing the individual dual fluid bed pyrolysis and reforming operations in the unique serial configurations described herein results in more efficient utilization of steam, catalyst, feedstocks, and fuel for high quality synthesis gas production than described in the art.

The disclosed system and method may allow significant capital cost reductions when applied to the gasification of high sulfur carbonaceous feedstocks, such as coal or petroleum coke, to produce synthesis gas suitable for production of Fischer-Tropsch liquids. Such cost reductions may result from elimination/minimization of the requirements for cryogenic oxygen, carbon monoxide shift, and/or acid gas removal facilities as typically required by conventional gasification processes for production of chemical-grade synthesis gas. In embodiments, the total loss of catalytic heat transfer material (due to attrition) to the high quality synthesis gas product (i.e. in line 220/220A) and to the combustor off gas (i.e. in line 240/240A) is less than about 5, 4, 3, 2 or 1 wt % of the active fluid bed inventory of catalytic heat transfer material within the DFB conditioning loop 200/200A per day. In embodiments, the total loss of heat transfer material (due to attrition) to the low quality synthesis gas product (i.e. in line 150/150A) and to the second combustor off gas (i.e. in line 195/195A) is less than about 5, 4, 3, 2 or 1 wt % of the active fluid bed inventory of heat transfer material within the DFB gasification pyrolysis loop 100/100A per day.

In embodiments, a Ni DFB conditioner as described herein can serve the same purpose as a 'generic' reformer from the standpoint of converting methane and other hydrocarbons into synthesis gas. NiDFB conditioning as described herein is superior to conventional SMRs and ATRs in this service.

When combined with FT conversion, the disclosed system and method may provide higher overall Fischer-Tropsch liquids yields, lower capital investment, and/or greater flexibility in gasification feedstock. The disclosed DFB system and method may allow for synthesis gas production and/or conditioning in the absence of or the presence of reduced size (1) additional hydrogen sulfide removal equipment upstream the FT synthesis reactor(s), (2) oxygen-blown gasifiers and/or combustors, and/or (3) carbon dioxide removal apparatus upstream of the FT synthesis reactor(s).

The disclosed system and method allow flexibility of operating a primary gasification loop 100/100A at a lower temperature than a secondary conditioning loop 200/200A. This may result in one or more of the following advantages: higher overall thermal efficiency may be achieved when processing high ash feeds such as lignite, tar sands and/or oil shale, due to lower sensible heat losses commensurate with the lower outlet temperature of the purged ash; a wider range of solid and/or liquid carbonaceous feedstocks with lower ash fusion temperatures may be gasified without ash agglomeration concerns, a general disadvantage of fluid bed gasification—perhaps most significantly when pure or enriched oxygen is required for conventional single fluid bed gasification designs; lower temperatures of primary gasification loop 100/100A tend to facilitate sulfur and/or halogen capture via lime and/or limestone addition, thereby facilitating the gasification of a wide variety of high sulfur solid, liquid, and gaseous feedstocks, such as high sulfur coal, petroleum coke, and other refinery residues such as residual fuel oil and unprocessed high sulfur wellhead natural gas; the lower quality synthesis gas resulting from the pyrolysis of less reactive feeds at lower temperatures in primary gasification loop 100 is offset by the high synthesis gas quality and yields achieved in the relatively high temperature secondary conditioning loop 200/200A.

The disclosed system and method may reduce or substantially eliminate potential byproduct soot formation during conditioning, which is another important advantage of the disclosed NiDFB conditioning system.

This dual fluid bed reaction concept, which resembles conventional petroleum refinery fluid catalytic cracking (FCC) technology in some respects, ameliorates or eliminates many of the drawbacks typical of conventional reforming technologies if applied to reforming of low quality synthesis gas. For example, the need for pure or enriched oxygen as required by conventional autothermal reformers (ATRs) may be eliminated by use of the disclosed system and method, for which air may be utilized. The need for costly alloy tubular metal reaction systems as required by steam methane reformers (SMRs), and the associated low firebox fuel efficiencies (typically only around 55%), may be bypassed via the disclosed system and method. High process steam requirements, generally required to prevent coking of reforming catalyst when applying conventional reforming technologies, may be reduced. The disclosed system and method may eliminate the need for a separate step to 'pre-reform' higher hydrocarbons (which may be present in low quality synthesis gas) prior to conventional reforming to prevent coking of the reforming catalyst. Utilization of the disclosed system and method may avoid production of $H_2$:CO mole ratios undesirably high for utilization in Fischer-Tropsch processes; such excessive mole ratios are typical for steam methane reformer-type technologies. The disclosed system and method may allow avoidance of carbon dioxide levels too high for Fischer-Tropsch processes; such excessive carbon dioxide levels are typical of autothermal reformer-type technologies. The disclosed system and method may allow tolerance to sulfide concentrations in excess of typical reforming tolerance, which is generally less than 1 ppm.

The yield of Fischer-Tropsch liquids from a carbonaceous feed material (yield defined here as barrels of FT liquids produced per dry ton of biomass) is increased by utilization of the disclosed system and method. In embodiments, the yield of FT liquids is increased by at least 10, 20, 30, 40, 50, 60, 70, 80, 90, or 100% relative to conventional gasification in the absence of dual fluid bed conditioning/reforming.

The disclosed system may be scaleable to large-scale. For example, a system of this disclosure may be adaptable to produce enough fuel for at least a 20,000 barrel per day (bpd) refinery.

EXAMPLES

Example 1

NiDFB Testing

Testing of a secondary DFB reformer loop 200 with a NiDFB pilot unit using Ni alumina catalyst and operating on various mixtures of synthetic feed gases containing various levels of tars, $H_2S$ and/or $SO_2$ contaminants were performed. Specifically, three experiments were performed, each having a run time of 32+ hours, for a total run time of 100 hours. The three experiments were conducted with varying levels of severity to the catalyst to confirm the performance of the NiDFB unit. In all cases, bottled gases (hydrogen, carbon monoxide and carbon dioxide and propane) were supplied from gas cylinders while methane was supplied via pipeline natural gas.

For the first test, the activated catalyst was preheated to reaction conditions in nitrogen. Once at reaction conditions, syngas matching the product gas expected from the primary gasification loop 100 was introduced into the NiDFB test unit and performance measured. Following the evaluation of this feedstock, the syngas feed was changed to a 'surrogate' syngas which resulted in the same product composition but was more practical to use for tests 2 and 3 and performance was confirmed. After the performance of the catalyst and process was confirmed with these two syngas compositions, the feed composition was varied along with operating temperature to monitor the performance of the unit. One run included the evaluation of dry reforming where only methane and carbon dioxide were fed to the unit.

For the second test, the catalyst utilized in the first test was preheated and placed into reaction with the surrogate syngas. Once it was confirmed that the catalyst activity had not changed, varying levels and compositions of tar species were added to the surrogate feed and the performance of the unit evaluated. The goal was to confirm that tars were gasified/reformed to below the target level of 200 mg/$Nm^3$. In reality the results showed conversion of the tars to syngas at or below the detectable limit of 1 mg/$Nm^3$. Additionally the dry reforming of methane and propane (in the presence of carbon dioxide) in the presence of tars was also tested with similar success.

For the third test, hydrogen sulfide and/or sulfur dioxide (at nominally 80-160 ppmv) was added to both the syngas feed and the combustor with and without the presence of tars. Operating temperatures were adjusted as needed to show methane conversions (to syngas) above 90%. Once the unit was stable with sulfur in the feed, tars were introduced to the syngas feed at concentrations exceeding 30,000 mg/$Nm^3$ and performance was monitored. Not only was the syngas composition monitored but the combustor flue gas was monitored for sulfur dioxide content. Limited temperature variations were made during run three.

Example 2

Gasification of RDF

In an embodiment, a system 10 comprising dual fluid bed conditioning loop 200/200A and dual fluid bed gasification loop 100/100A is applied to the gasification of woody biomass refuse derived fuel (RDF). In such an embodiment, yield of Fischer-Tropsch liquids is estimated to increase by almost 100% when the system and method are applied to reforming the low quality synthesis gas produced by a Battelle type dual fluid bed gasifier as documented by NREL report number TP-430-21612.

While preferred embodiments of the invention have been shown and described, modifications thereof can be made by one skilled in the art without departing from the spirit and teachings of the invention. The embodiments described herein are exemplary only, and are not intended to be limiting. Many variations and modifications of the invention disclosed herein are possible and are within the scope of the invention. Where numerical ranges or limitations are expressly stated, such express ranges or limitations should be understood to include iterative ranges or limitations of like magnitude falling within the expressly stated ranges or limitations (e.g. from about 1 to about 10 includes, 2, 3, 4, etc.; greater than 0.10 includes 0.11, 0.12, 0.13, and so forth). Use of the term 'optionally' with respect to any element of a claim is intended to mean that the subject element is required, or alternatively, is not required. Both alternatives are intended to be within the scope of the claim. Use of broader terms such as comprises, includes, having, etc. should be understood to provide support for narrower terms such as consisting of, consisting essentially of, comprised substantially of, and the like.

Accordingly, the scope protection is not limited by the description set out above but is only limited by the claims which follow, that scope including all equivalents of the subject matter of the claims. Each and every original claim is incorporated into the specification as an embodiment of the present invention. Thus, the claims are a further description and are an addition to the preferred embodiments of the present invention. The disclosures of all patents, patent applications and publications cited herein are hereby incorporated herein by reference, to the extent that they provide procedural or other details consistent with and supplementary to those set forth herein.

What is claimed is:

1. A method of producing a high quality synthesis gas comprising less than a desired percentage of non-synthesis gas components, which are components other than hydrogen and carbon monoxide, and a desired mole ratio of hydrogen to carbon monoxide, the method comprising:
    producing a low quality synthesis gas comprising greater than the desired percentage of non-synthesis gas components via gasification of a carbonaceous feed in a gasifier;
    introducing the low quality synthesis gas into a fluid bed conditioner, wherein the fluid bed conditioner is one fluidized bed reactor of a dual fluidized bed loop, and wherein the fluid bed conditioner is operated at a higher temperature than the gasifier;
    introducing a flue gas into a fluid bed combustor, wherein the fluid bed combustor is the second fluidized bed reactor of the dual fluidized bed loop;
    extracting a first catalytic heat transfer stream comprising a catalytic heat transfer material and having a first temperature from the fluid bed conditioner, and introducing at least a portion of the first catalytic heat transfer stream into the fluid bed combustor;
    extracting a second catalytic heat transfer stream comprising catalytic heat transfer material and having a second temperature greater than the first temperature from the fluid bed combustor, and introducing at least a portion of the second catalytic heat transfer stream into the fluid bed conditioner; and
    extracting high quality synthesis gas comprising the desired percentage of non-synthesis gas components and the desired mole ratio of hydrogen to carbon monoxide from the fluid bed conditioner.

2. The method of claim 1 wherein the low quality synthesis gas comprises at least 50,000 mg/Nm$^3$ tar and the high quality synthesis gas comprises less than about 1 mg/Nm$^3$ tar; wherein the high quality synthesis gas comprises less than about 1 ppmv hydrogen sulfide; or both.

3. The method of claim 1 wherein the high quality synthesis gas comprises less than about 5 ppmv hydrogen sulfide, wherein the high quality synthesis gas has a desired mole ratio of hydrogen to carbon monoxide of about 1:1, or both.

4. The method of claim 1 wherein the desired mole ratio is obtained by adjusting the amount of steam in the fluid bed conditioner by adjusting the steam fed to the gasifier, the moisture content of the carbonaceous feed, or both, such that the steam to carbon ratio in the fluid bed conditioner is in the range of from about 0.1 to about 1.0.

5. A method for continuous dry reforming, the method comprising:
    introducing a feed comprising carbon dioxide and at least one selected from methane and propane into a fluid bed conditioner operated at a conditioning temperature, and with a mole ratio of steam to carbon in the range of from about 0.1 to about 1, wherein the fluid bed conditioner is one fluid bed of a dual fluidized bed loop and is configured to convert at least a portion of said feed into synthesis gas components;
    extracting a first catalytic heat transfer stream comprising a catalytic heat transfer material and having a first temperature from the fluid bed conditioner, and introducing at least a portion of the first catalytic heat transfer stream and a flue gas into a fluid bed combustor, wherein the fluid bed combustor is configured to regenerate the catalyst via combustion;
    extracting a second catalytic heat transfer stream comprising catalytic heat transfer material and having a second temperature from the fluid bed combustor, and introducing at least a portion of the second catalytic heat transfer stream into the fluid bed conditioner; and
    extracting synthesis gas from the fluid bed conditioner.

6. The method of claim 5 wherein the catalytic heat transfer material is selected from the group consisting of nickel olivine, silica, nickel alumina, and combinations thereof.

7. The method of claim 5 wherein the flue gas comprises up to 100 ppmv sulfur dioxide, wherein the spent flue gas comprises less than about 0.5 vol % carbon monoxide, or both.

8. The method of claim 5 wherein the fluid bed combustor is operated at from 1 to 1.1 times stoichiometric air.

9. The method of claim 5 wherein the feed comprises from at least 50 ppmv hydrogen sulfide, wherein the feed comprises at least 30,000 mg/Nm$^3$ tar, wherein the flue gas introduced into the fluid bed combustor comprises from about 80 ppmv to about 160 ppmv sulfur dioxide, or a combination thereof; and wherein the synthesis gas comprises less than about 1 ppmv hydrogen sulfide, less than about 200 mg/Nm$^3$ tar, or both.

10. The method of claim 5 wherein the feed comprises methane, carbon dioxide, and tar; and wherein the molar conversion of the methane, the carbon dioxide, the tar, or a combination thereof is at least 90%.

11. The method of claim 5 wherein extracting the first catalytic heat transfer stream from the fluid bed conditioner and introducing at least a portion of the first catalytic heat transfer stream and a flue gas into a fluid bed combustor is effected via a lower loop seal.

12. The method of claim 5 further comprising introducing at least a portion of the synthesis gas extracted from the fluid bed conditioner into a candle filter configured to provide a product synthesis gas and a separated solids stream, and introducing at least a portion of the separated solids stream into the first catalytic heat transfer stream.

13. The method of claim 5 further comprising subjecting at least a portion of the synthesis gas to Fischer-Tropsch conversion, thus producing a Fischer-Tropsch tailgas and liquid hydrocarbons; and
    recycling at least a portion of the Fischer-Tropsch tailgas into the fluid bed conditioner, the fluid bed combustor, or both.

14. The method of claim 1 wherein the fluid bed combustor is operated at from 1 to 1.1 times stoichiometric air, wherein the spent flue gas comprises less than 1 vol. % oxygen, or both.

15. The method of claim 1 wherein the low quality synthesis gas is introduced into the fluid bed conditioner without recovering heat therefrom, such that the low quality synthesis gas produced in the gasifier is introduced into the fluid bed conditioner as a hot gas feed.

16. The method of claim 1 further comprising subjecting at least a portion of the high quality synthesis gas to Fischer-Tropsch conversion, thus producing a Fischer-Tropsch tailgas and liquid hydrocarbons; and
    recycling at least a portion of the Fischer-Tropsch tailgas into the fluid bed conditioner, the fluid bed combustor, the gasifier, or a combination thereof.

17. The method of claim 16 comprising not subjecting the at least a portion of the high quality synthesis gas to water gas shift, hydrogen sulfide removal, acid gas removal, or a combination thereof, prior to subjecting the at least a portion of the high quality synthesis gas to Fischer-Tropsch conversion.

18. The method of claim 1 wherein gasification further comprises:
    introducing the carbonaceous feed and optionally steam into the gasifier, wherein the gasifier is a fluid bed gasifier comprising a fluidized bed of heat transfer material and operable to produce low quality synthesis gas therefrom, extracting a first heat transfer stream comprising a heat transfer material and unconverted carbonaceous material and having a third temperature from the gasifier, introducing the first heat transfer stream, oxidant, and fuel into a second fluid bed combustor operable to produce a flue gas, and extracting a second heat transfer stream comprising heat transfer material and having a fourth temperature greater than the third temperature from the second fluid bed combustor, and introducing at least a portion of the second heat transfer stream into the fluid bed gasifier.

19. The method of claim 18 further comprising:

introducing at least a portion of the high quality synthesis gas into at least one Fischer-Tropsch conversion reactor, thus producing a Fischer-Tropsch tailgas, a Fischer-Tropsch catalyst slurry wax purge, and liquid hydrocarbons from the at least a portion of the high quality synthesis gas; and recycling at least a portion of the Fischer-Tropsch tailgas to the fluid bed conditioner, the fluid bed gasifier, the fluid bed combustor, the second fluid bed combustor, or a combination thereof; recycling at least a portion of the low quality synthesis gas, the high quality synthesis gas, or both to the fluid bed gasifier as fluidization gas; or a combination thereof.

* * * * *